(12) United States Patent
Kuroda et al.

(10) Patent No.: US 6,810,198 B1
(45) Date of Patent: Oct. 26, 2004

(54) RECORD AND PLAYBACK DEVICE

(75) Inventors: Tokuji Kuroda, Osaka (JP); Shiro Kato, Osaka (JP); Tatsushi Bannai, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 778 days.

(21) Appl. No.: 09/713,150

(22) Filed: Nov. 15, 2000

(30) Foreign Application Priority Data

Nov. 15, 1999 (JP) .......................................... 11-324015
Nov. 16, 1999 (JP) .......................................... 11-325092

(51) Int. Cl.[7] ............................................... H04N 5/91
(52) U.S. Cl. ......................... 386/46; 386/95; 386/109; 386/124; 386/129
(58) Field of Search .......................... 386/46, 95, 109, 386/124, 129

(56) References Cited

U.S. PATENT DOCUMENTS

| | | | |
|---|---|---|---|
| 5,359,464 A | * 10/1994 | Wilkinson | .................. 386/124 |
| 5,396,374 A | * 3/1995 | Kubota et al. | ................. 386/95 |
| 5,418,620 A | * 5/1995 | Nishino et al. | ............. 386/124 |
| 5,541,782 A | * 7/1996 | Kobayashi et al. | ......... 386/109 |
| 5,929,902 A | * 7/1999 | Kwok | .......................... 348/96 |
| 6,618,547 B1 | * 9/2003 | Peters et al. | .................. 348/96 |

FOREIGN PATENT DOCUMENTS

| | | |
|---|---|---|
| JP | 06318374 | 11/1994 |
| JP | 11018052 | 1/1999 |

* cited by examiner

*Primary Examiner*—Vincent Boccio
*Assistant Examiner*—James A. Fletcher
(74) *Attorney, Agent, or Firm*—RatnerPrestia

(57) ABSTRACT

A number of outer parities to be added to an audio data is changed responsive to a ratio of frame frequencies of a video signal (e.g. 24 Hz or 30 Hz) before the data is recorded. Comparing with a first format, a recording bit rate is increased in a second format. Audio 4 channels (audio sectors 5–8) are additionally recorded maintaining a video data format (video sectors 1, 2) of the first format and an audio data format (audio sectors 1–4) of the first format.

2 Claims, 30 Drawing Sheets

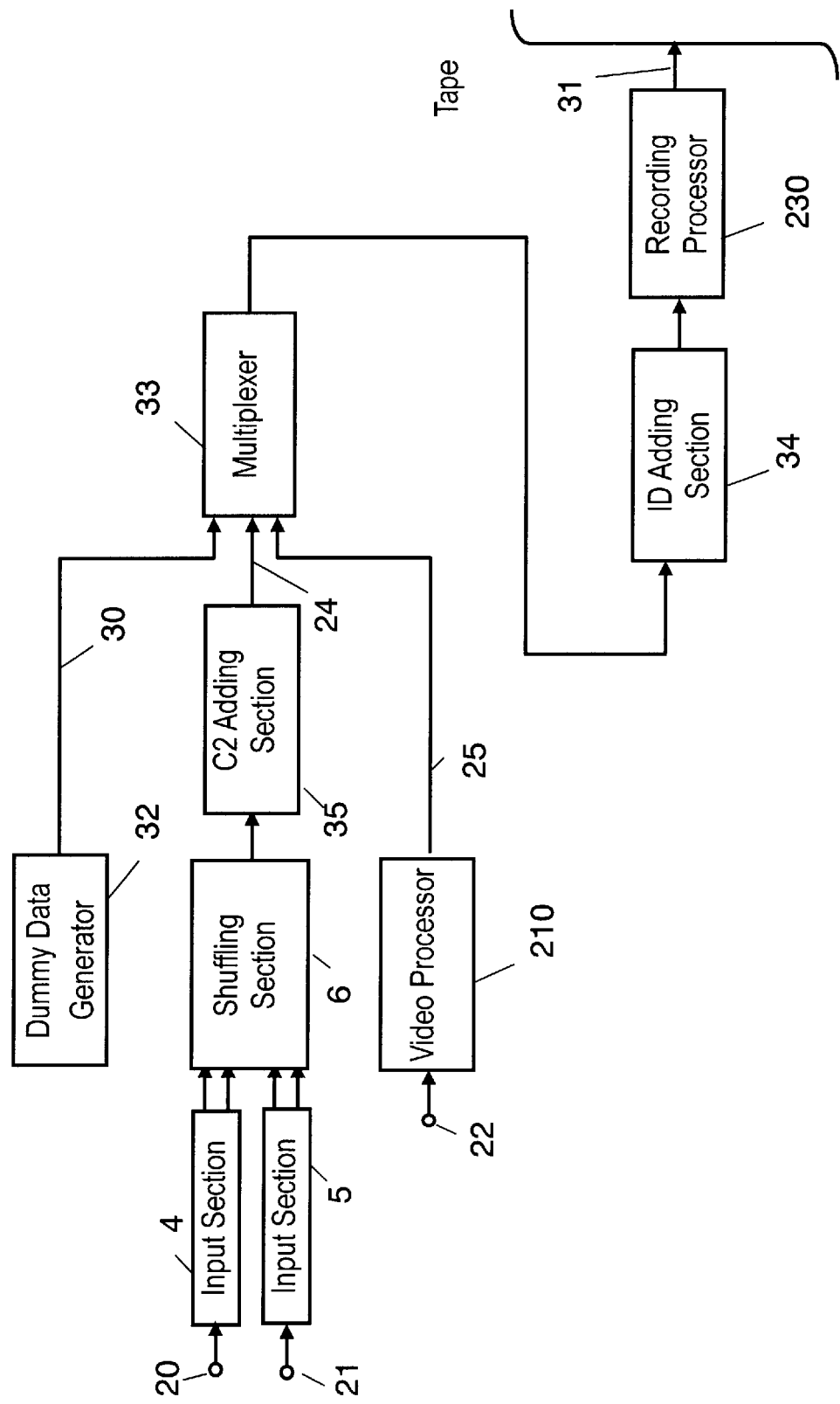

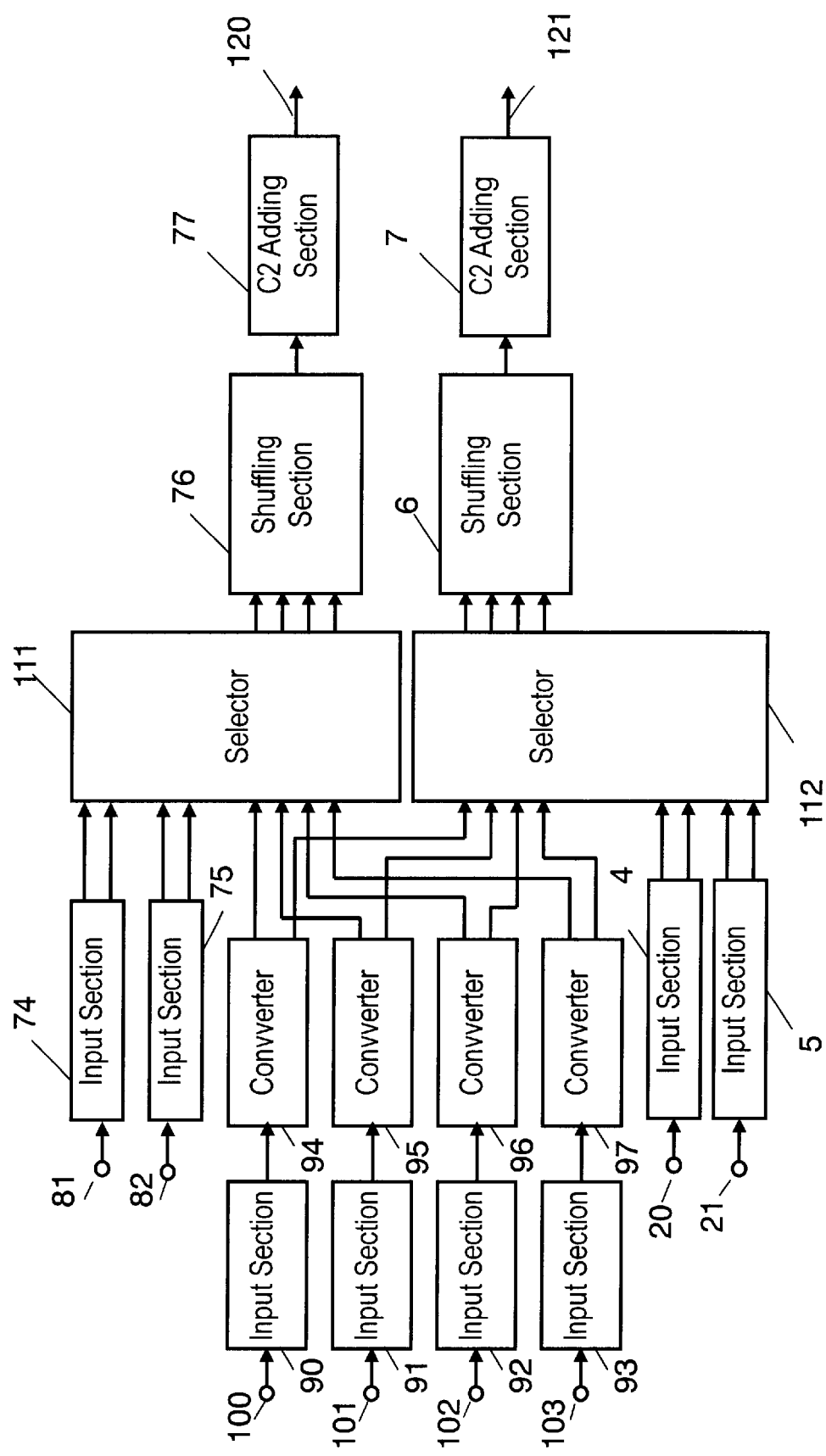

RECORD AND PLAYBACK DEVICE

FIELD OF THE INVENTION

The present invention relates to a record and playback device, such as a digital VCR, for recording or playing back data including a video signal and an audio signal.

BACKGROUND OF THE INVENTION

Recently an innovative broadcasting method is developed such as a high definition television (HDTV), and in the U.S., a digital television (DTV) method has been commercialized.

In the DTV broadcasting system, a video signal is coded through Moving Picture Experts Group—2 (MPEG 2) method and is combined with a multi-channel audio signal, e.g. by a Dolby Digital method, then is broadcast as a digital broadcasting. Meanwhile, MPEG 2 is disclosed as 13818 standard of International Organization for Standardization/International Electro-technical Commission (ISO/IEC). The digital broadcasting features that multi-channels can be transmitted with quality picture in a narrow frequency bandwidth because video signals are compressed and coded.

In this climate, portable devices and studio devices capable of the HDTV method have been developed. However, those devices are expensive and thus producing the program for the HDTV broadcasting incurs a lot of cost and time. Accordingly the program is sometimes produced by converting a cinema film to TV application. In the U.S., film oriented programs are usually on-aired through the DTV.

Cinema-film has typically has 24 frames per second, i.e. it produces a progressive scanning signal of 24 Hz frame frequency (hereinafter referred to as a 24$p$ signal). On the other hand, a VCR handles a TV signal of 30 Hz frame frequency. Therefore, conversion of the frame frequency is necessary. Converting a cinema film into TV signals is generally called telecine conversion. This conversion is known as 2:3pull down technique.

When the converted signal through 2:3pull down technique is recorded in a conventional VCR, the same field is repeated, which limits an edit process. Therefore, it is desired that the cinema film as it is, i.e. at a frame frequency of 24 Hz, to be recorded with the VCR.

In audio devices, DVD-AUDIO standard is established for digital Versatile Disc (DVD). According to this standard, an audio signal sampled at 96 kHz is recorded and played back, and sound of the higher quality than that of a conventional method is obtainable. As such, due to an introduction of a digital technique, an audio signal of higher quality is going to be available at home.

An instance of the VCR that records and plays back the HDTV signal is HD-D5·VCR. A video signal is coded complying with HD-D5 method which is disclosed in 342M standard of Society of Motion Picture and Television Engineers (SMPTE). The HD-D5·VCR is disclosed in SMPTE 279M standard.

The HD-D5·VCR records and plays back a video signal of interlace scanning and an audio signal of four channels. Details of respective signals are as follows:

video signal; a number of scanning lines=1125 lines, a number of active scanning lines=1080 lines, field frequency=60 Hz (or 59.94 Hz)

audio signal; sampling frequency=48 kHz, a number of quantizing bits=20.

When a video signal of 24 Hz frame frequency is recorded with the VCR discussed above, an equivalent frequency for overall signal process is lowered by 24/30 for record and playback comparing with the case where a video signal of 30 Hz frame frequency (60 Hz field frequency) is recorded.

Data amount per frame of the video signal remains the same regardless of 24 Hz or 30 Hz frame frequency, therefore, changing the rotational components from 24 Hz system to 30 Hz system allows video data to be recorded in the same tape format.

On the other hand, as for the audio signal, input data corresponding to one field of the video signal are collected in every input channel, and an error correcting code is added before the audio signal is recorded.

In the case of recording a video signal of 30 Hz frame frequency, a number of audio samples per one channel, one field of a digital audio signal sampled at 48 kHz is 48000/60=800. In the case of 24 Hz frame frequency, it is 48000/48=1000. As such, the numbers of samples per field are different between 24 Hz and 30 Hz, the audio signal thus cannot be recorded in the same recording area.

Then an audio sampling frequency is converted to 48000×24/30=38400 Hz by using a digital filter. A number of samples of the audio signal of which sample frequency is converted to 38.4 kHz is 38400/48=800 per one channel and one field, this is the same value as the case where a frame frequency is 30 Hz. Thus this audio signal can be recorded in the same recording area on tape.

However, the method discussed above uses the digital filter for converting the audio sampling frequency, and this deteriorates sound quality depending on a number of taps or bits. Further, this lowers the sampling frequency, and if the original frequency bandwidth is not limited to a certain extent, return distortion would occur. Therefore, the frequency bandwidth of the input audio signal should be limited.

The conventional method discussed above records and plays back only an audio signal of four channels. When a program material for the HDTV is made from a cinema film, an original cinema film contains audio signals in multi-channel form typically represented by Dolby Digital method. The Dolby Digital method uses the data of six channels while a VCR which records and plays back the cinema film only uses four channels for audio signals. For recording the audio signal of the cinema film as they are, the VCR which can uses at least six channels or preferably eight channels is demanded.

The conventional method discussed above records and plays back only the audio signal sampled at 48 kHz, and cannot record and play back a higher quality sound such as the audio signal sampled at 96 kHz or the audio signal quantized with 24 bits.

In general, two methods are available to increase a number of audio channels.

The first method is to compress the audio data more than four channels to the data of four channels, and record the compressed data with the conventional VCR. However, when the data is compressed, sound quality is somewhat lowered, therefore, this method cannot be accepted as a VCR for producing a source program. Further, the compression produces some delay, and this causes the entire system to be complicated. The compression further amplifies the influence due to an error produced in the VCR.

The second method is to develop a totally new tape format complying with the multi-channel audio signals. Developing the new tape format allows arbitrary design of devices; however, it takes a lot of time and costs a lot of money for developing the devices, and it is difficult for a new device to be compatible with the conventional format.

For usability of the VCR, it is desirable that a conventional record/playback device—which handles audio data of only four channels—plays back a recorded medium, in which audio data of more than four channels are recorded, to reproduce the sound of four channels (downward compatibility). It is also desirable that a recorded medium—which was recorded with the conventional record/playback device—is played back with a record/playback device, capable of handling more than four channels, to reproduce sound of four channels (upward compatibility).

SUMMARY OF THE INVENTION

The present invention addresses the problems discussed above.

A record/playback device of the present invention complies with a first format in which a first video signal and a first audio signal are to be recorded, and a second format in which a second video signal and a second audio signal are to be recorded. The second video signal has a lower frame frequency than the first video signal and the second audio signal has the same data amount per unit time as the first audio signal. The record/playback device comprises the following elements:

(a) a video processor for outputting video recorded data having the same frame frequency as an input video signal, where the input video signal is the first or the second video signal;

(b) an audio processor for providing an input audio signal with shuffling and adding of an outer code, then outputting audio recorded data per frame or field of an input video signal. The input audio signal is the first or second audio signal; and (c) a recording processor for digitally recording the output data from the video processor and the audio processor onto a recording medium.

The audio processor equalizes coding amount of audio recorded data of the first format with that of the second format per field or frame. The record/playback device records, both in the first format and the second format, the video recorded data and audio recorded data in the same recording-track-format onto a recording medium.

The record/playback device of the present invention complies with a first, second and third formats. The details of respective formats are as follows: (1) The first format records the first video signal and the first audio signal. The first audio signal is quantized with n (n=a natural number) bits. (2) The second format records the first video signal and the second audio signal. The second audio signal is quantized with m (m=a natural number and m>n) bits. (3) The third format records the second video signal having a lower frame frequency than the first one, and a third audio signal.

The record/playback device comprises the following elements in order to comply with the second and third formats in addition to the first format:

(a) a video processor for outputting video recorded data having the same frame frequency as an input video signal, where the input video signal is the first or the second video signal, and where the video processor outputs the second video signal as video recorded data in the third format;

(b) a first audio processor for outputting a first audio recorded data in the first format, where the upper "n" bits data of the second audio signal has undergone a shuffling process and an adding process of an outer code.

(c) a second audio processor for outputting a second audio recorded data in the second format, where the lower (m−n) bits data of the second audio signal has undergone the shuffling process and the adding process of an outer code;

(d) a third audio processor for outputting a third audio recorded data in the third format, where the third audio signal has undergone the shuffling process and the adding process of an outer code;

(e) a multiplexer for multiplexing the first audio recorded data and the second audio recorded data; and (f) a recording processor for recording the video recorded data and the audio recorded data onto a recording medium, where the audio recorded data is an output from the multiplexer or the third audio recorded data.

The first audio recorded data, the outer code amount of the second audio recorded data and the outer code amount of the third audio recorded data have the same data quantity.

The record/playback device of the present invention complies with the first format which records a video signal and the first audio signal as well as the second format which records the video signal, the first and second audio signals. The device comprises the following elements in order to complies with the first and second formats:

(a) a video processor for outputting the video signal as video recorded data in the first format;

(b) a first audio processor for outputting the first audio signal as first audio recorded data in the first format;

(c) a second audio processor for outputting the second audio signal as second audio recorded data in the second format;

(d) a multiplexer for multiplexing and outputting the video recorded data, first audio recorded data, and second audio recorded data;

(e) a recording processor for recording the multiplexed data digitally onto a recording medium.

In the case of the second format, the recording processor works at higher than N2 times processing speed when it records in the first format (N2 is a bit-rate ratio of the second format vs. the first format). The recording processor records the second audio signal into an area corresponding to the area of the recording medium where the first audio signal is recorded.

Further, the record/playback device of the present invention complies with the first format recording the video signal and the first audio signal as well as a third format recording the video signal and the third audio signal. The device comprises the following elements in order to comply with these two formats:

(a) a video processor for processing a video signal and outputting video recorded data in the first format;

(b) a converter for converting the third audio signal into a-fourth audio signal which is in the same specification as the first audio signal and a fifth audio signal in accordance with a given rule in every time sequence;

(c) a first audio signal processor for processing the fourth audio signal and outputting the first audio recorded data in the first format;

(d) a second audio processor for processing the fifth audio signal and outputting the second audio recorded data in the second format;

(e) a multiplexer for multiplexing the video recorded data, the first and second audio recorded data, and outputs the multiplex recorded data; and (f) a recording processor for recording the multiplex recorded data digitally onto a recording medium.

The recording processor works at the processing speed higher than N times of recording in the first format (N is a bit-rate ratio of the second format vs. the first format). The recording processor records the second audio signal in an area adjacent to the area of the recording medium where the first audio signal is recorded.

BRIEF DESCRIPTION OF THE DRAWINGS

FIG. 10 is a block diagram illustrating a construction of a record/playback device in accordance with a second exemplary embodiment of the present invention.

FIG. 24B is a detailed block diagram illustrating a structure of audio processor 620 shown in FIG. 24A.

DESCRIPTION OF THE PREFERRED EMBODIMENT

Exemplary embodiments of the present invention are demonstrated hereinafter with reference to the accompanying drawings.

(Exemplary Embodiment 1)

Figure 1:
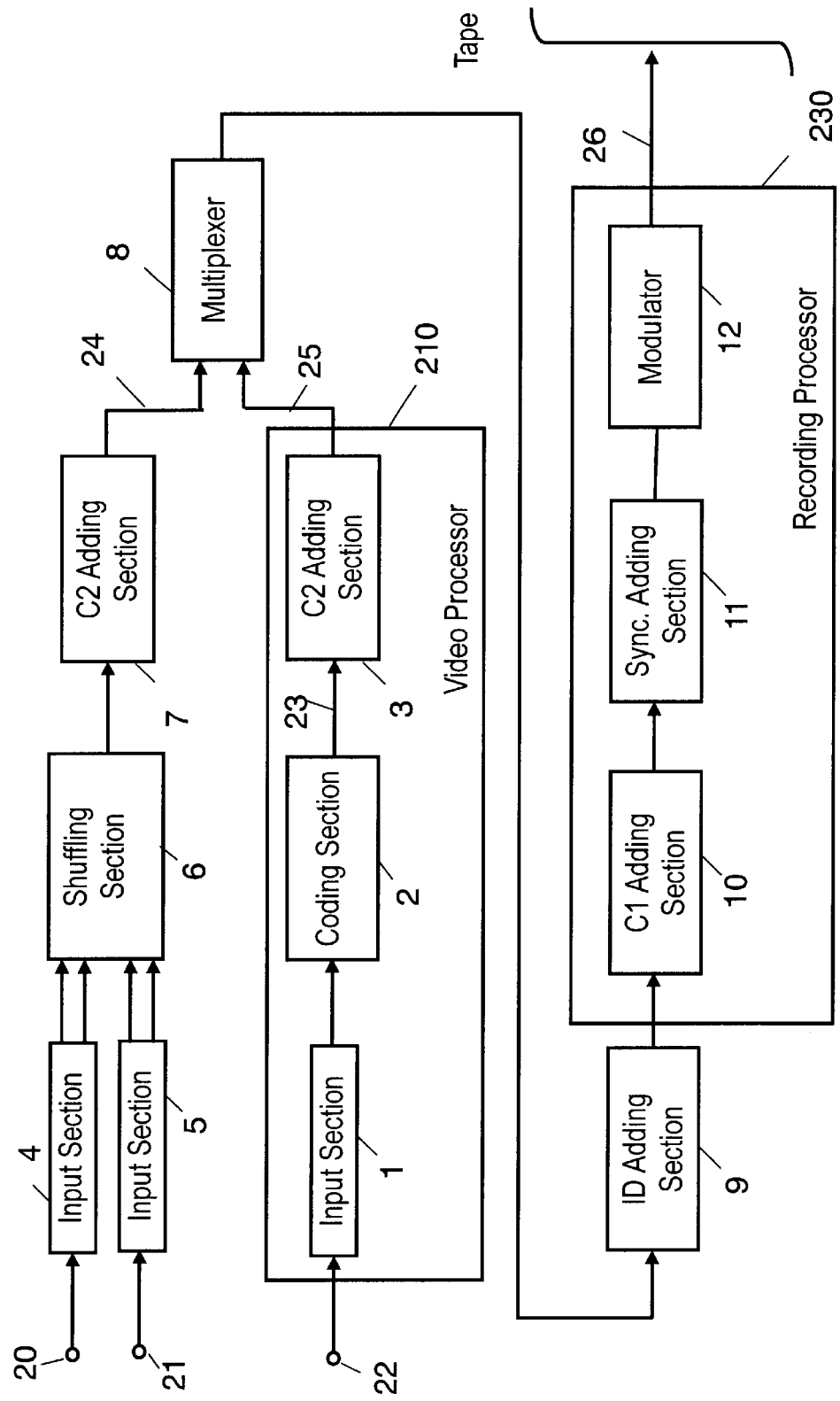
FIG. 1 is a block diagram illustrating a construction of a record/playback device in accordance with a first exemplary embodiment of the present invention.

FIG. 1 is a block diagram illustrating a construction of a record/playback device in accordance with the first exemplary embodiment of the present invention. The digital VCR shown in FIG. 1 records/plays back a 60$i$ signal and a 24$p$ signal together with an audio signal of four channels. The 60$i$ signal is an interlace scanning video signal and has 1125 scanning lines, 1080 active scanning lines, and 60 Hz field frequency. The 24$p$ signal is a progressive scanning video signal and has 1125 scanning lines, 1080 active scanning lines, and 24 Hz frame frequency.

When the 24$p$ signal is recorded/played back, a number of audio samples per field of a video signal is different from that of the 60$i$ signal.

The VCR used in this first embodiment has a different number of outer code parities to be added to audio data in handling the 24$p$ signal and 60$i$ signal, so that the quantity of audio recorded data per field becomes the same in both the cases. Thus the audio recorded data of both the cases are recorded in the same recording area on a tape.

This is demonstrated hereinafter with reference to FIG. 1.

In FIG. 1, a 60$i$ signal or a 24$p$ signal is fed into input terminal 22.

Input terminal 20 receives channel 1 and channel 2 of digital audio signals specified by AES/EBU. Input terminal 21 also receives channel 3 and channel 4 of the digital audio signals. The sampling frequency of the audio signals is 48 kHz, and a number of quantizing bits is 20.

First, the case when input terminal 22 receives a 60$i$ signal is described. In this case, a video signal is processed as same as that is handled by HD-D5 VCR.

Input terminal 22 receives the 60$i$ signal and input section 1 outputs digital video data to be recorded. Coding section 2 compresses the video data to approx. ¼ at a field unit by using Discrete Cosine Transform (DCT) method. At C2 adding section 3, compressed video data 23 is added an outer code parity (C2) for error correcting, then transferred to multiplexer 8. The outer code is Reed-Solomon code RS(128, 120). In other words, outer code parity of 8 bytes is added to 120 bytes video data. Input section 1, coding section 2 and C2 adding section 3 constitute video processor 210.

When input terminal receives the 60$i$ signal, a process of an audio signal is described hereinafter. Meanwhile processing of the audio signal is the same as that is handled in HD-D5 VCR.

In FIG. 1, digital audio signals tapped off from input terminal 20, 21 are fed into input sections 4, 5, which separate the channels and output respective channels. Shuffling section 6 carries out the shuffling, i.e., changing the order of audio data in a sample unit per channel and field. The audio data undergone the shuffling is fed into C2 adding section 7 where C2 is added to respective channels, then the data is transmitted to multiplexer 8.

Figure 2:
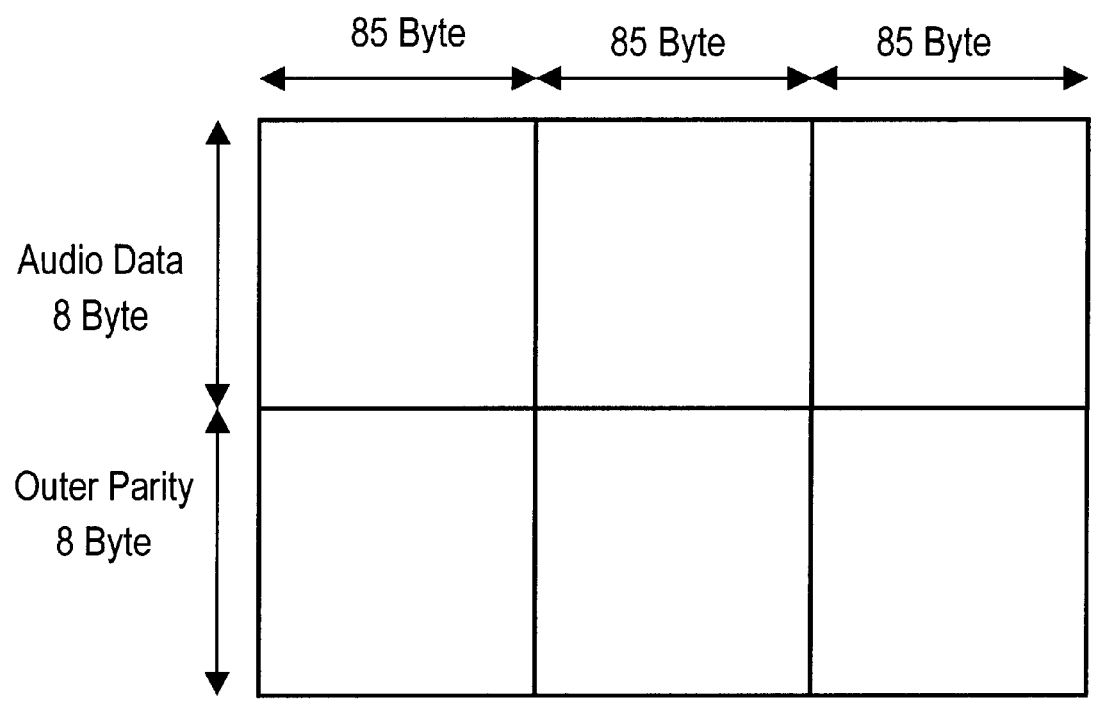
FIG. 2 shows a construction of a product code of an audio signal in the record/playback device.

FIG. 2 illustrates a structure of a product code comprising an outer code and an inner code per channel and field of audio data. The vertical direction represents an outer code block and horizontal one represents an inner code block. An inner code parity (C1) is not shown in FIG. 2. The outer code is Reed-Solomon Code RS (16, 8), thus 8 bytes of C2 is added to every 8 bytes of audio data. Since one byte contains 8 bits, quantizing 20 bits is 2.5 bytes.

As shown in FIG. 2, audio data of 816 samples per channel and field can be recorded, where 816=85/2.5×3×8.

A number of audio samples per channel and field of an input audio signal is 48000/60=800. In other words, recordable samples per channel and field exceeds 800 samples, therefore, the input audio signal is recordable.

At multiplexer 8, the audio data from C2 adding section 7 is multiplexed with the video data from C2 adding section 3. The multiplexed video and audio data are divided into 4 recording channels, i.e. a number of recording channels corresponding to a number of recording heads. Then the data are assigned ID numbers at ID adding section 9. The ID number is assigned to respective sync. blocks, which is a minimum unit in recording/playing back, for identifying a type and an order of the sync. blocks. The data are processed onward channel by channel.

C1 adding section 10 adds C1 to output data from ID adding section 9, and the resultant data becomes the inner code block.

Figure 8:
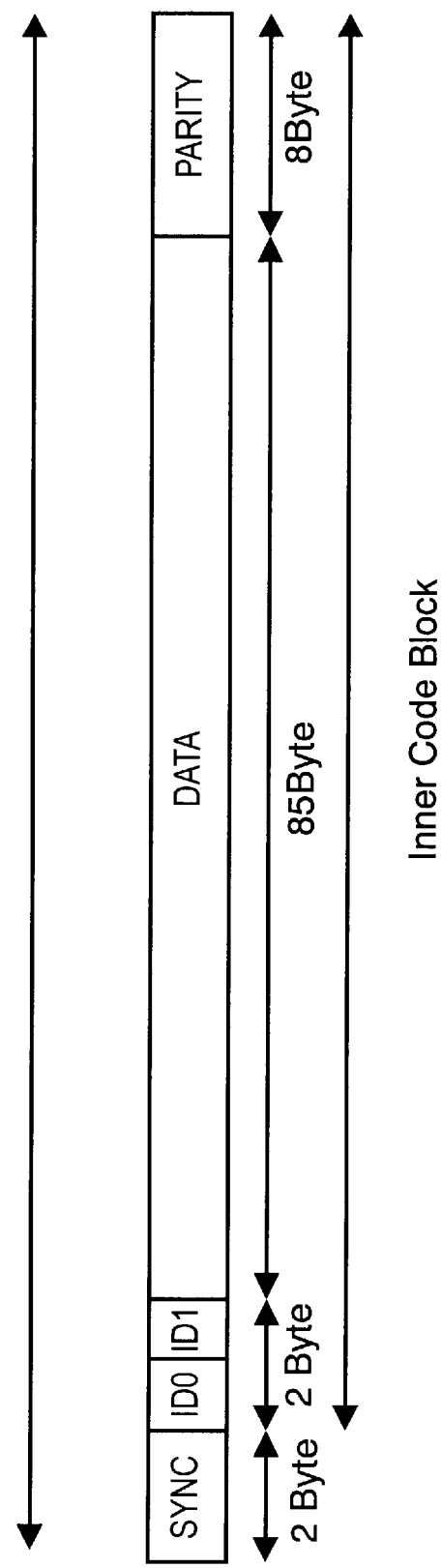
FIG. 8 shows a structure of a sync. block and an inner code block in the record/playback device.

FIG. 8 illustrates a structure of a sync. block including an inner code block. The sync. block comprises a sync. signal (SYNC) and an inner code block (ID0, ID1, DATA, PARITY). The inner code is Reed-Solomon code RS(95, 87), and the inner code block comprises 2 bytes of ID section, 85 bytes of data section and 8 bytes of C1.

Next, at sync. adding section 11, a sync signal of 2 bytes is added to the top of the inner code block, so that the sync. block shown in FIG. 8 is constituted. An output from sync. adding section 11 undergoes 8–14 modulation at modulator 12, and record signal 26 is recorded on the tape. C1 adding section 10, sync. adding section 11 and the modulator constitute recording processor 230.

Figure 3:
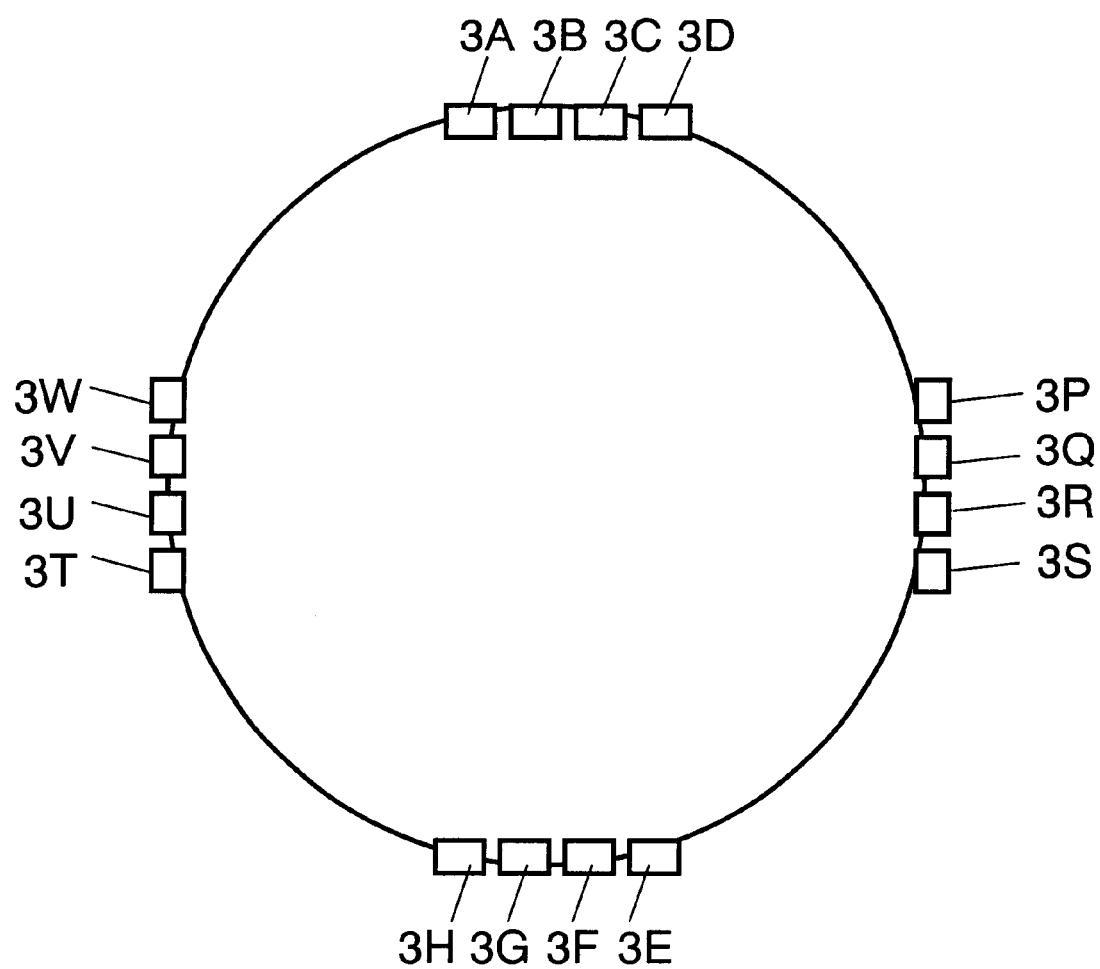
FIG. 3 illustrates the placement of heads on a rotary drum in the record/playback device.

FIG. 3 illustrates the placement of heads on a rotary drum in the record/playback device. Four recording heads 3A, 3B, 3C, 3D and another group of heads 3E, 3F, 3G, 3H placed at 180 degree with respect to the other heads to face each other. Those heads carry out the azimuth recording. Two sets of playback heads are placed at 90 degree deviation from the recording head. A set of the playback heads contains four heads and the two sets are mounted at 180 degree with respect to the other set, so that the two sets face each other. The recording heads carry out recording the signal tapped off from modulator 12 onto the magnetic tape. In other words, every time when rotary drum rotates approx. 180 degree, four tracks are formed on a magnetic tape. These four tracks are called a segment. Since the rotary drum rotates 3 times of the frame frequency (in the case of 60*i* signal, 90 revolutions/second), 3 segments are formed in one field.

Figure 4:
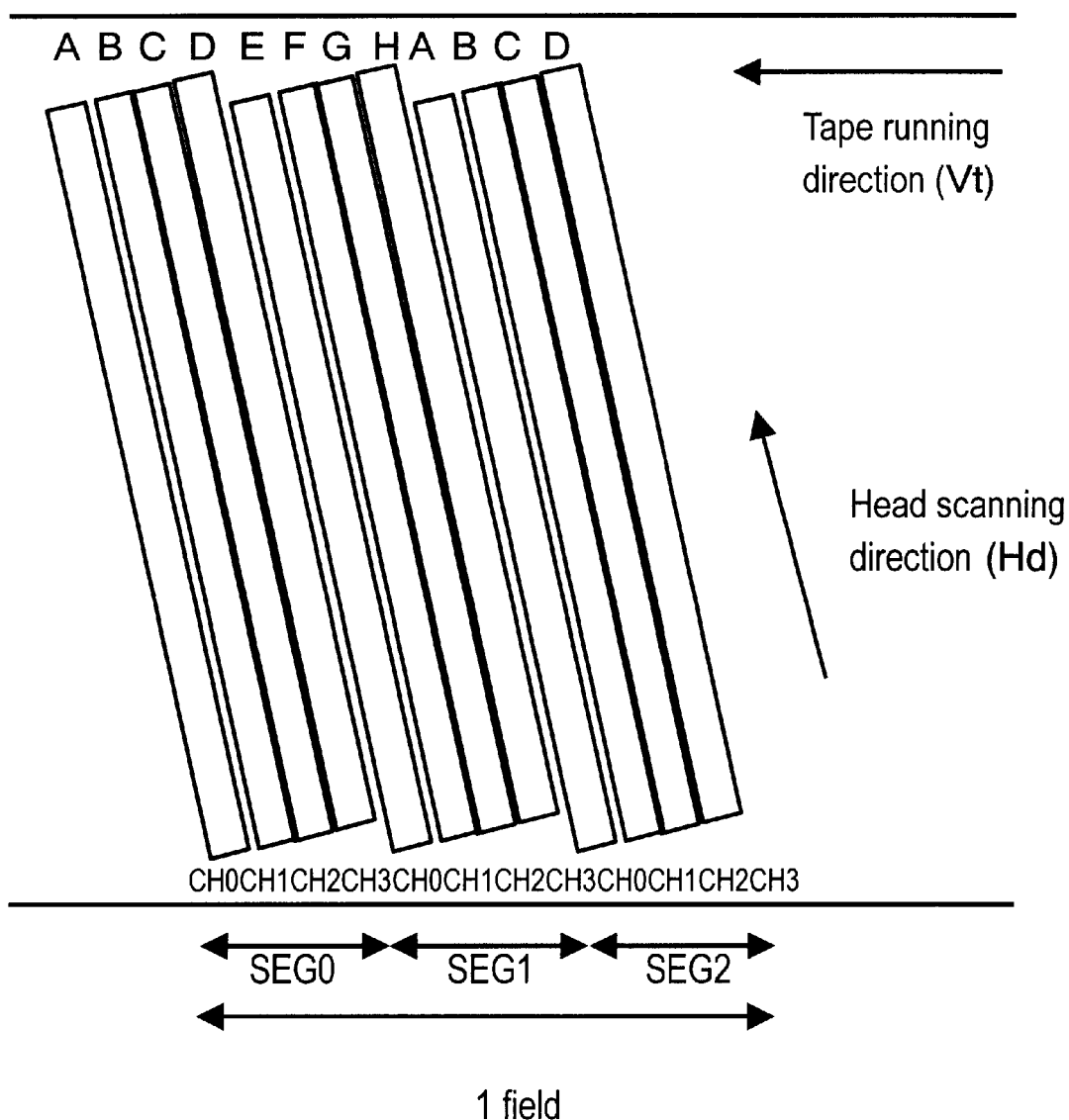
FIG. 4 illustrates the placement of tracks on a tape in the record/playback device.

As shown in FIG. 4, three segments SEG0, SEG1, SEG2 are recorded in a period of one field. One segment has four recording channels CH0, CH1, CH2, CH3. This track format is the same as that of HD-D5VCR.

Figure 5:
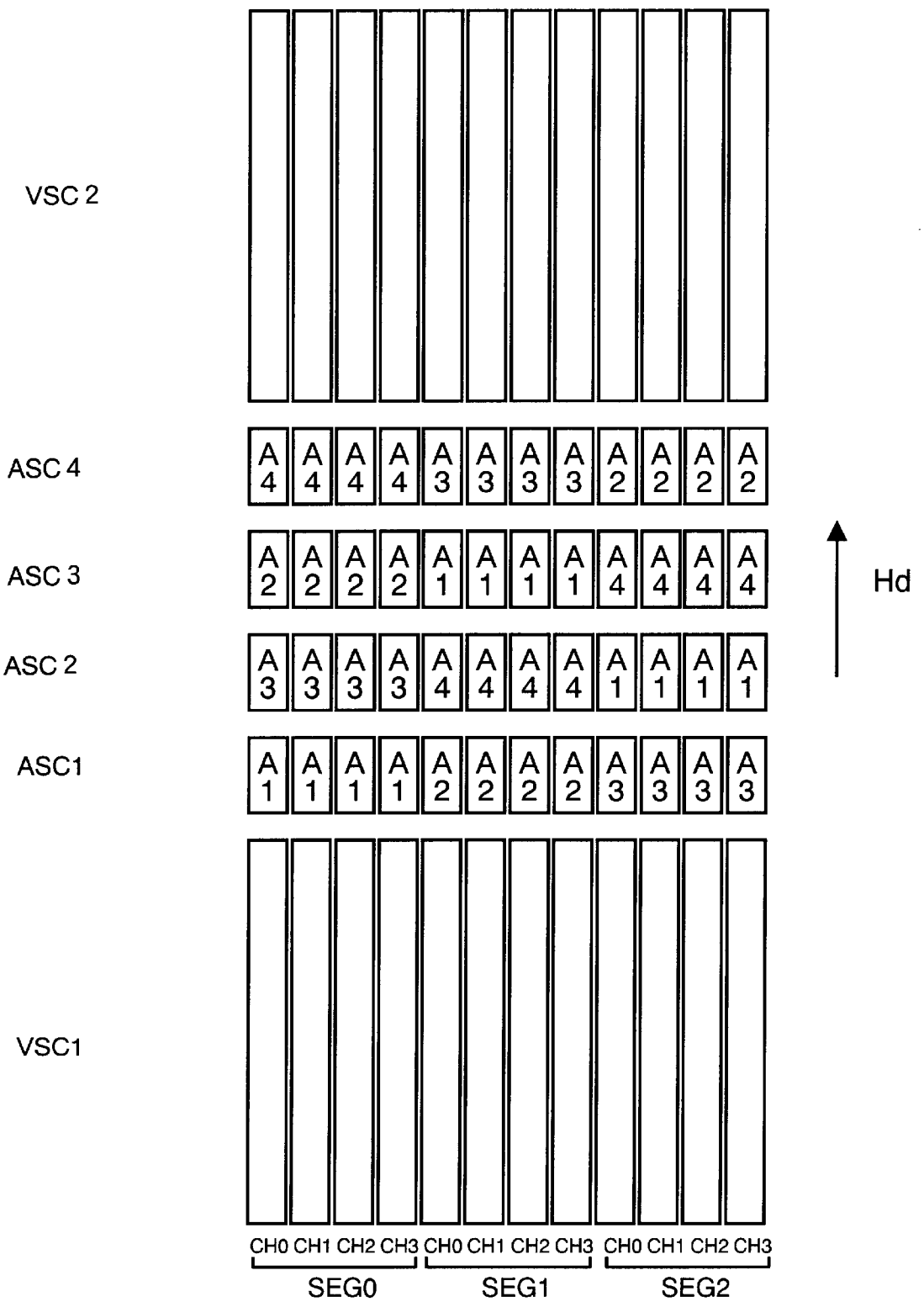
FIG. 5 illustrates recording-track-patterns in the record/playback device.

As shown in FIG. 5, respective recording tracks are divided into two video sectors (VSC1, VSC2) and four audio sectors (ASCs 1–4). One video sector is formed of 256 sync. blocks, and one audio sector is formed of 4 sync. blocks. Between the video sector and audio sector, and between respective audio sectors, edit gaps are provided for editing. In FIG. 5, reference marks A1, A2, A3, A4 represent channel 1, channel 2, channel 3, channel 4 respectively.

Figure 6A:
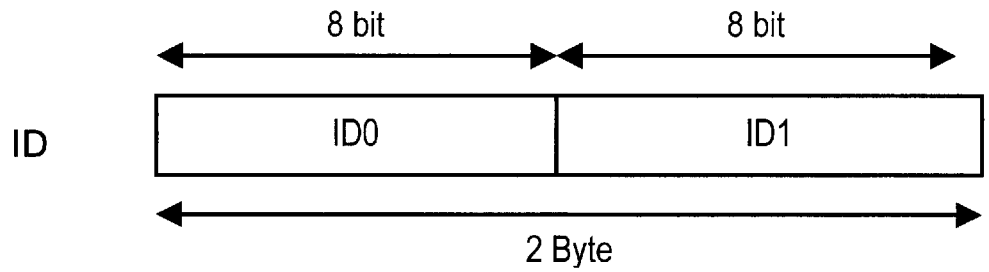
FIGS. 6A–6D illustrates ID numbers assigned to respective sync. blocks in the record/playback device.
Figure 6B:
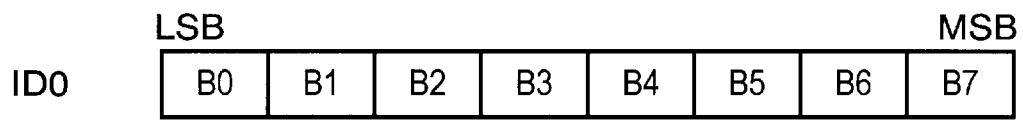

The ID number is described hereinafter with reference to FIGS. 6A–6D. As shown in FIGS. 6A and 6B, the ID number is formed by ID0 and ID1 both having 8 bits, in total 2 bytes. ID0 is formed by the lower 8 bits (B0–B7) out of 9 bits block number (B0–B8.), where "B8" is most significant bit (MSB).

Figure 6C:
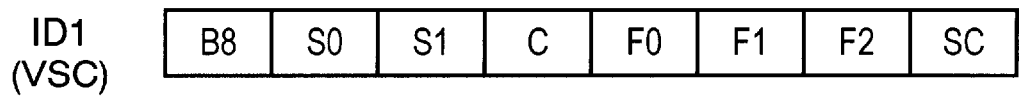

As shown in FIG. 6C, ID1 of the video sector consists MSB (B8) of block No., segment No. (S0, S1), MSB (C) of track No., Field No. (F0, F1), and sector No. (SC) arranged from least significant bit (LSB) side.

The segment No. is assigned for identifying the segment and takes one of 0–2. The MSB of the track No. is assigned for identifying the track channel. Track No. 0 is assigned to CH0, CH1, and track No. 1 is assigned to CH2, CH3. The field No. shows a field number of an input signal and takes one of 0–3. The sector No. is assigned for identifying a sector among themselves and takes 0 or 1.

Figure 6D:
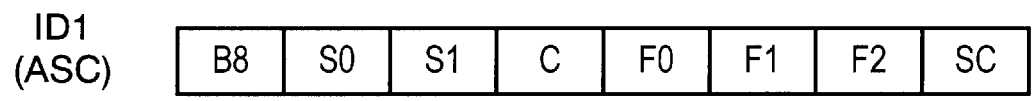

As shown in FIG. 6D, audio sector ID1 has MSB (B8) of block No., segment No. (S0, S1), track MSB (C) of No., field No. (F0, F1), sample number flag (F2) and sector No. (SC) arranged from LSB side. The sample number flag is assigned for identifying 5 field-sequence of an audio signal, and shows 801 audio samples or 800 audio samples are in one field. Other Nos. are defined the same as those of the video sector.

Figure 7:
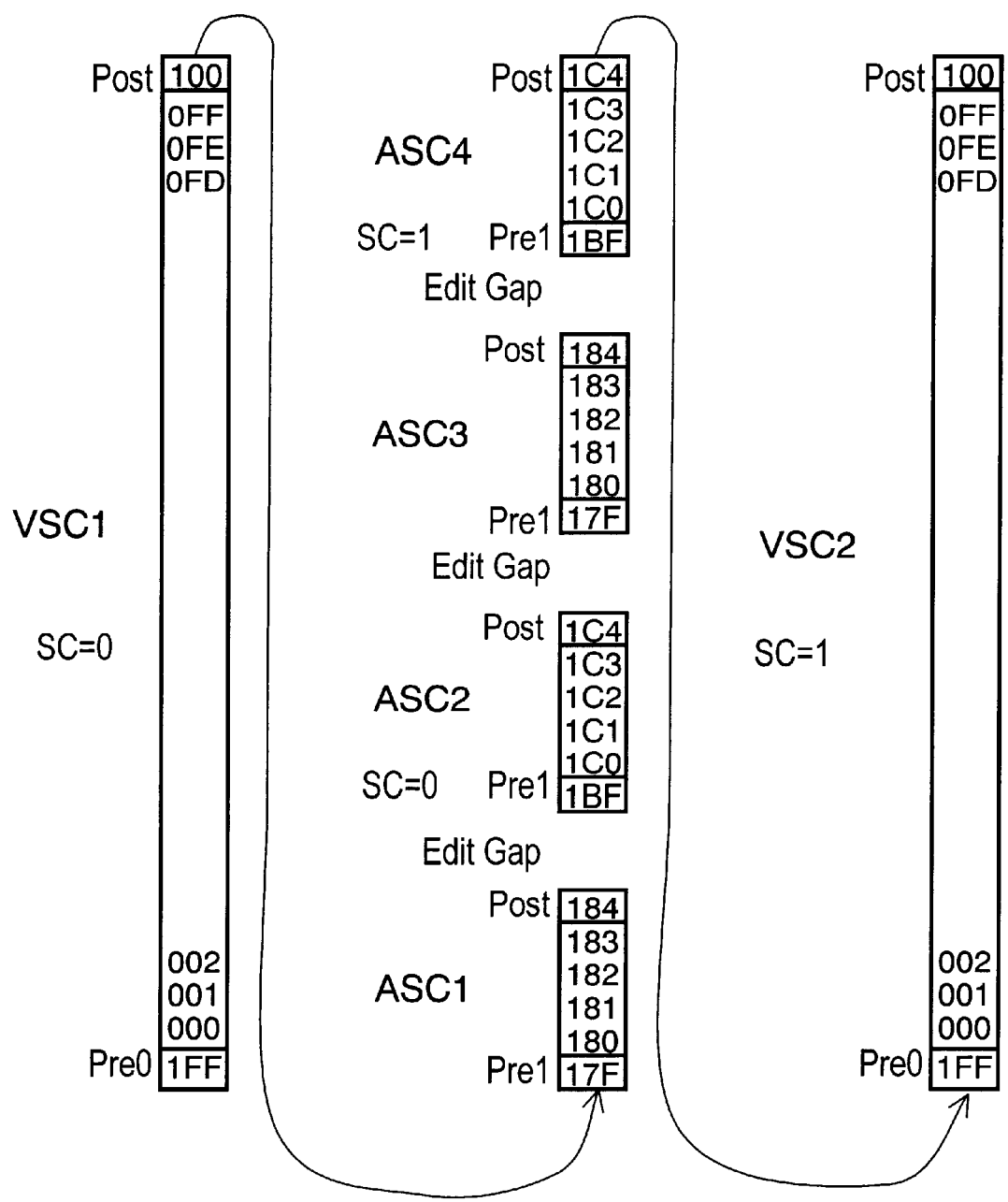
FIG. 7 shows ID numbers assigned to respective sync. blocks in the record/playback device.

The block No. is added to respective sync. blocks. FIG. 7 details the block No. Except preamble sections (Pre0, Pre1) and post-amble section (Post) provided for establishing the sync., the block No. ranges from 000h to 0FFh in the video sector (VSC) and 180*h*–183*h*, 1C0*h*–1C3*h* in the audio sector (ASC). The "h" following the numerals show that the numbers are written in the hexadecimal system. (The description onward uses the same expression.)

Regarding ID1, the definition is partially changed depending on VSC and ASC. In FIG. 7, the sync. block assigned the same block Nos. are identified by their sector Nos.

On the other hand, the process in playback is reversal to the recording process, thereby playing back a video signal and an audio signal.

As discussed above, when the 60*i* signal is recorded, the same process as in HD-D5 VCR is carried out, so that the same format as conventional HD-D5 VCR is formed.

Next, the case when input terminal 22 receives a 24*p* signal is described.

Input section 1 outputs digital video data to be recorded. Coding section 2 changes read-out sequence of 24*p* signal, so that the signal is converted to pseudo-interlace-scanning-signal. Then the data is compressed using DCT method in each field. As a result, the video data is compressed to approx. ¼.

The compressed video data is added an outer code parity (C2) for error correcting in C2 adding section 3, then transferred to multiplexer 8.

The process of the audio signal when the 24*p* signal is fed into terminal 22 is described hereinafter.

Input sections 4, 5 and shuffling section 6 process the data in the same manner as the 60*i* signal is input; however, the shuffling method at shuffling section 6 is different from that for the 60*i* signal. The audio data shuffled are added C2 channel by channel at C2 adding section 7.

Figure 9:
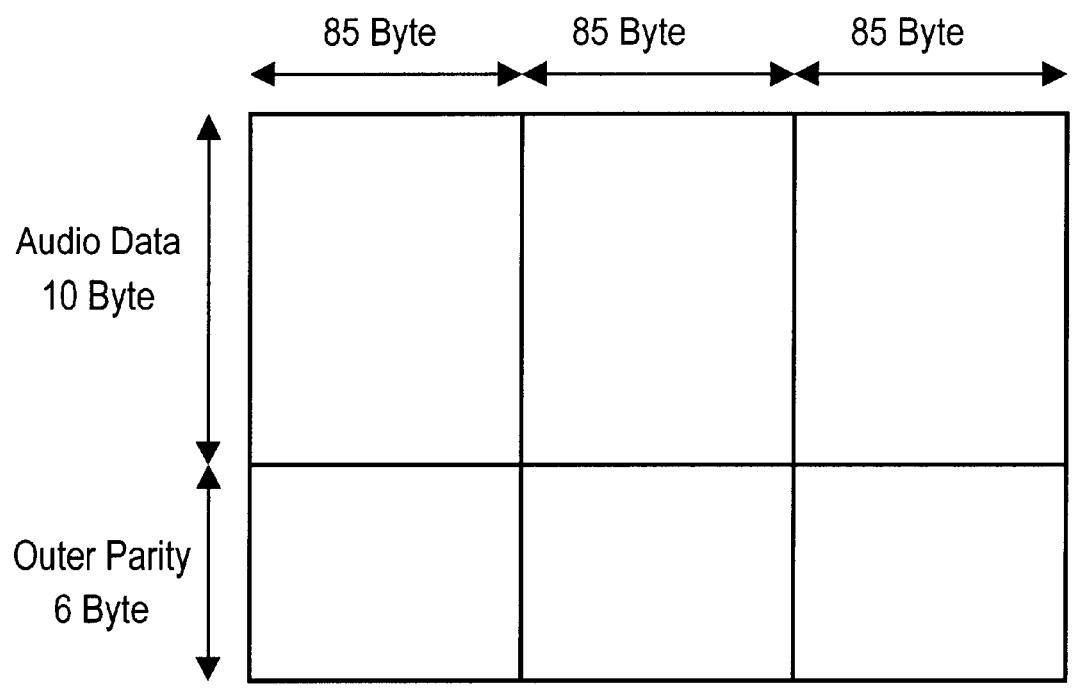
FIG. 9 shows a structure of a product code block of an audio signal in the record/playback device.

FIG. 9 illustrates a structure of a product code comprising an outer code and an inner code per channel and field of audio data. The vertical direction represents an outer code block and horizontal one represents an inner code block. An inner code parity (C1) is not shown in FIG. 9. The outer code is RS (16, 10), thus 6 bytes of C2 is added to every 10 bytes of audio data.

As shown in FIG. 9, audio data of 1020 samples per channel and field can be recorded, where 1020=85/2.5×3× 10.

Because a number of audio samples per channel and field of an input audio signal is 48000/48=1000 (samples), there is an enough recording capacity.

At multiplexer 8, the audio data from C2 adding section 7 and the video data from C2 adding section 3 are multiplexed. The multiplexed video and audio data are fed into ID adding section 9.

The processes after the ID is assigned are the same as the case input terminal 22 receives the 60*i* signal. However, the process speed at multiplexer 8, ID adding section 9, recording process section 230 is multiplied by the ratio of frame frequencies, i.e., 24/30. A rotating speed of the rotary drum and tape speed are also multiplied by 24/30. Therefore, a width and a slant of a track to be recorded on a tape are the same as the case when the 60*i* signal is recorded.

The first exemplary embodiment has been discussed above, and when the 24*p* signal is recorded, the block No. of an ID No. to be assigned may be different from that in the 60*i* signal.

Instead of the 24*p* signal, a video signal having the field frequency of 50 Hz can be used. In this case, an outer code RS(16, 10) is added to an audio signal, so that an enough recording area is obtainable.

This first embodiment proves that the same track pattern can be formed by both the cases, i.e., the case when the 24*p* signal is recorded, and the case when the 60*i* signal is recorded. In other words, both the cases have the same recording wavelength, so that the characteristics of heads and tapes become the same. This contributes to easier designing and simpler circuits.

In both the cases, audio data volumes are the same per field, so that the elements from multiplexer 8 to modulator 12 can be commonly used to two types of video signals. This contributes to lowering the cost.

In this embodiment, the operating modes of shuffling section 6 and C2 adding section 7 are changed responsive to 24*p* signal and 60*i* signal; however, a shuffling section and a C2 adding section dedicated to respective signals can be provided instead.

(Exemplary Embodiment 2)

FIG. 10 is a block diagram illustrating a construction of a digital VCR in accordance with a second exemplary embodiment of the present invention. This digital VCR records/plays back a 24*p* signal or a 60*i* signal together with an audio signal of four channels.

In this second embodiment, head-placement on the drum, a track pattern on a tape, rotating speed of the rotary drum, and tape speed are the same as those in the first embodiment.

In FIG. 10, the blocks bear the same reference marks as in FIG. 1 perform in the same manner as the blocks in FIG. 1.

The case when input terminal 22 receives a 24*p* signal is described hereinafter.

A video signal is processed in video processor 210. The process is the same as in the first embodiment, thus the description is omitted here.

The same audio signal as in the first embodiment is fed into input terminals 20, 21 in the same manner as in the first embodiment. Also the same processes as in the first embodiment are carried out at input sections 4, 5 and shuffling section 6.

At C2 adding section 35, a shuffled audio data is added outer-codearity parity (C2) channel by channel.

Figure 11A:
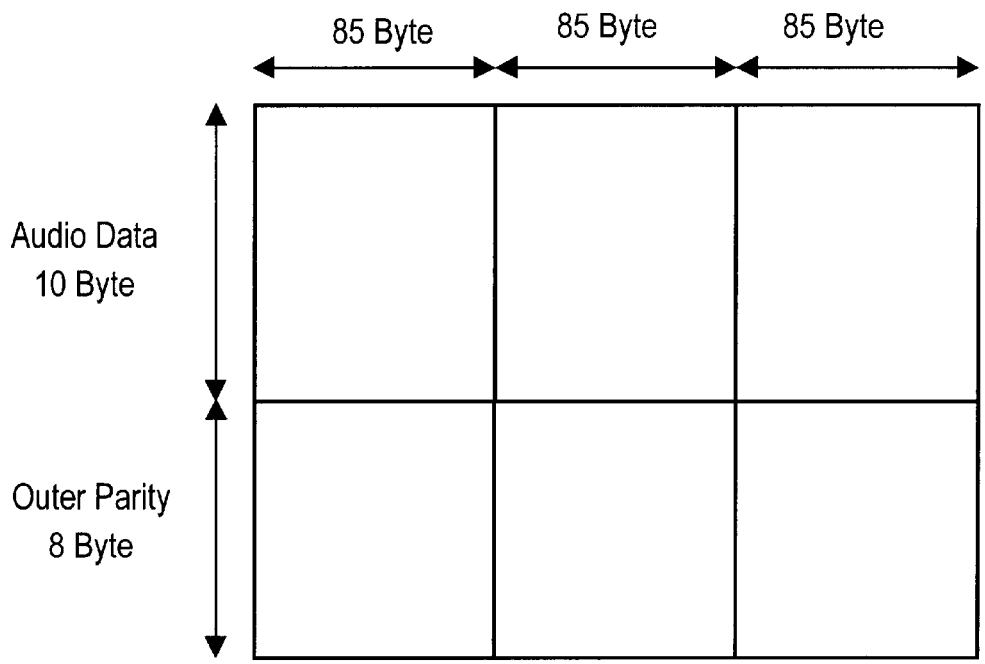
FIGS. 11A–11B shows a structure of a product code block of an audio signal in the record/playback device in accordance with the second embodiment.

FIG. 11A shows a structure of a product code formed of an outer code and inner code of audio data per channel and field. The vertical direction represents an outer code block, and the horizontal direction represents an inner code block. An inner code parity of the inner code block is not shown in FIG. 11A. The outer code is RS(18, 10). In other words, 8 bytes of C2 is added to every 10 bytes of audio data.

As shown in FIG. 11A, audio data of 1020 samples per channel and field can be recorded, where 1020=85/2.5×3× 10. A number of samples per channel and field of an input audio signal is 48000/48=1000 samples at frame frequency of 24 Hz (field frequency 48 Hz). Therefore, an enough recording capacity is prepared.

At multiplexer 33, audio data 24is multiplexed with video data 25. The multiplexed video and audio data are divided into a number of recording channels i.e. four channels, and are added an ID number at ID adding section 34.

ID adding section 34 assigns an ID number corresponding to a number of sync. blocks. The processes in recording processor after ID adding section 34 are practically the same as that in the first embodiment, thus the description thereof is omitted here.

Next, the case when input terminal receives a 60*i* signal is described hereinafter. The process at video processor 210 is the same as in the first embodiment, thus the description is omitted here.

The same audio signal as in the first embodiment is fed into input terminals 20, 21 in the same manner as in the first embodiment. Also the same processes as in the first embodiment are carried out at input sections 4, 5 and shuffling section 6.

At C2 adding section 35, a shuffled audio data is added outer-code-parity (C2). The outer code is RS(16, 8) as shown in FIG. 11B, thus 8 bytes of C2 is added to every 8 bytes of audio data.

Figure 11B:
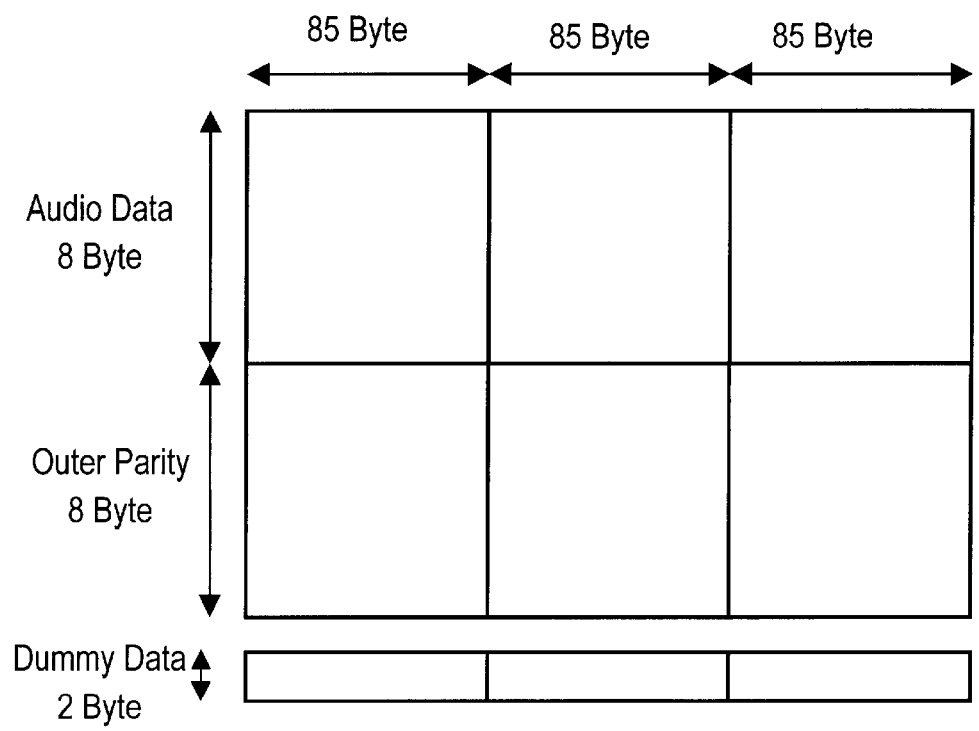

As shown in FIG. 11B, audio data of 816 samples per channel and field can be recorded, where 816=85/2.5×3×8. A number of samples per channel and field of an input audio signal is 48000/60=800 samples at frame frequency 30 Hz (field frequency 60 Hz). Therefore, an enough recording capacity is prepared.

Dummy data generator 32 generates dummy data corresponding to 6 sync. blocks. FIG. 11B also shows a structure of a dummy data block. The dummy data is added to an audio data, so that a total volume of the audio data, to be recorded on a tape, including an error correcting code becomes the same as the 24*p* signal.

The processes at ID adding section 34 and recording processor 230 after multiplexer 33 are the same as those of 24*p* signal except the processing speed, which is multiplied by 30/24 to that of 24*p* signal. A rotating speed of the rotary drum and a tape speed are also multiplied by 30/24. Therefore, the width and slant of the track to be recorded on the tape are the same as those in the case of recording the 24*p* signal.

In the ID Nos. assigned at ID adding section 34, only the block No. is the same as the case of the 24*p* signal; however, a different ID number can be assigned.

In this second embodiment, control data such as metadata can be recorded instead of the dummy data. In this case, six sync. blocks, which are not involved in the structure of the outer code, form a new outer code block, then the error correcting capability against errors happened in the tape can be improved. For instance, the control data is recorded in three sync. blocks, and the outer code parity is recorded in remaining three sync. blocks to form RS(6, 3) code, thereby increasing the error-correcting-capability.

Instead of the 24p signal, e.g. a video signal having a field frequency of 50 Hz can be used. In this case, the outer code of audio data is to be RS (18, 10) thereby preparing an enough recording area.

The second embodiment proves that in both the cases of recording the 24p signal and the 60i signal, the recording wavelength becomes the same. This contributes to easier designing and simpler circuits.

In both the cases, audio data volumes are the same per field, so that the elements from multiplexer 33 to modulator 12 can be commonly used to two types of video signals. This contributes to lowering the cost. Since the same number of the outer code parities is used, a error-correcting-circuit can be commonly shared.

In this embodiment, the operating modes of shuffling section 6 and C2 adding section 35 are changed responsive to the 24p signal and 60i signal; however, a shuffling section and a C2 adding section dedicated to respective signals can be provided instead.

(Exemplary Embodiment 3)

Figure 12:
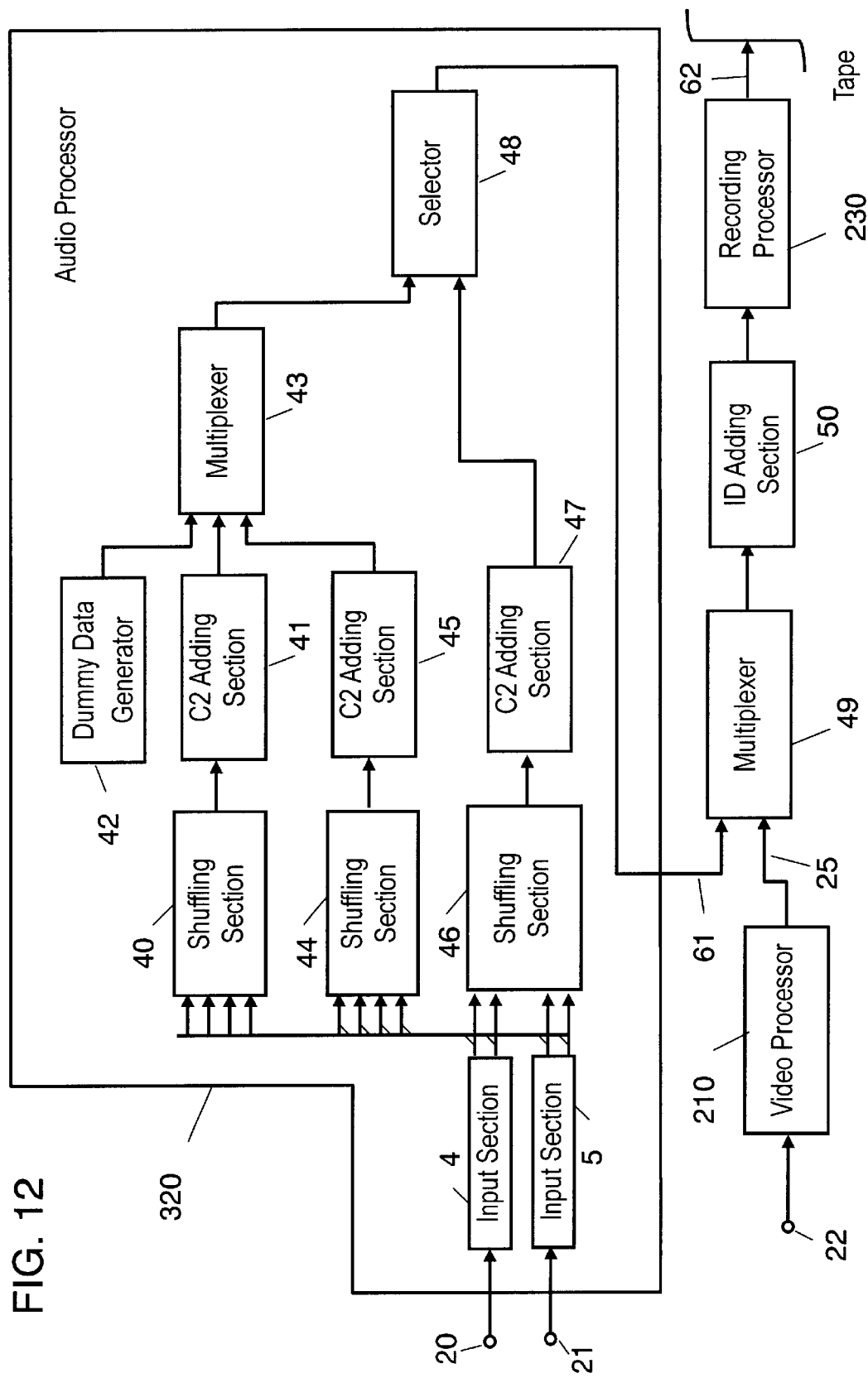
FIG. 12 is a block diagram illustrating a construction of a record/playback device in accordance with a third exemplary embodiment of the present invention.

FIG. 12 is a block diagram illustrating a digital VCR in accordance with the third exemplary embodiment of the present invention. This digital VCR records/plays back a 24p signal or 60i signal together with an audio signal of 4 channels.

In this third embodiment, head-placement on the drum, a track pattern on a tape, rotating speed of the rotary drum, and tape speed are the same as those in the first embodiment.

In FIG. 12, the blocks bear the same reference marks as in FIG. 1 perform the same operation as the blocks in FIG. 1.

The case when input terminal 22 receives the 60i signal is described hereinafter.

A video signal is processed at video processor 210. The process is the same as in the first embodiment, thus the description is omitted here.

Next, when the 60i signal is input, the way of the audio signal being processed is described hereinafter.

Input terminal 20 receives channel 1 and channel 2 of a digital audio signal specified by AES/EBU. Input terminal 21 receives channel 3 and channel 4 of the audio signal. Sampling frequency of the audio signal is 48 kHz, and a number of qunatizing bits is 24 (m=24).

In this third embodiment, input sections 4, 5 carry out channel separation as did in the first embodiment. Further, it divides audio data into upper 20 bits (n=20) and lower 4 bits (m−n=4).

Shuffling section 44 shuffles the upper 20 bits data in a unit of field time of 60i signal channel by channel. The shuffling method is the same as that in the case when the 60i signal is input in the first embodiment. C2 adding section 45 adds an outer code parity (C2) to shuffled upper 20 bits channel by channel.

Figure 14:
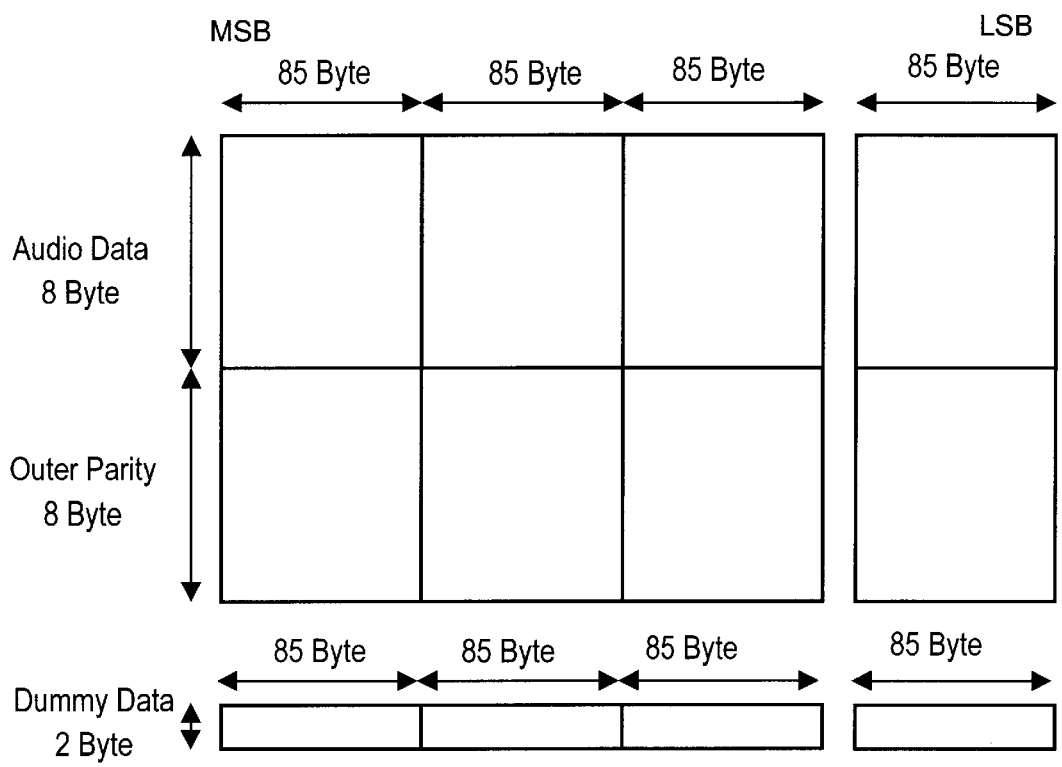
FIG. 14 shows a structure of dummy data and a product code block of an audio signal in the record/playback device.

FIG. 14 shows a structure of a product code formed of an outer code and inner code of audio data per channel and field. The vertical direction represents an outer code block, and the horizontal direction represents an inner code block. An inner code parity (C1) of the inner code block is not shown in FIG. 14. The outer code added to the upper 20 bits audio data is RS(16, 8), namely, 8 bytes of outer code parity (C2) is added to every 8 bytes of audio data.

As shown in FIG. 14, the upper 20 bits audio data of 816 samples per channel and field can be recorded, where 816=85/2.5×3×8. A number of samples per channel and field of an input audio signal is 48000/60=800 samples at frame frequency of 30 Hz (field frequency 60 Hz). Therefore, an enough recording capacity is prepared.

The lower 4 bits audio data, which was separated at input section 4 and 5, is shuffled at shuffling section 40 channel by channel. The shuffled lower 4 bits audio data is added C2 channel by channel at C2 adding section 41 where 8 bits of 2 samples are treated as 1 byte data. The outer code is RS(16, 8) as same as the upper bits, thus C2 of 8 bytes is added to every 8 bytes audio data.

As shown in FIG. 14, lower 4 bits audio data of 1360 samples (1360=85/0.5×8) per channel and field can be recorded, since this number is over 800 samples, an enough recording capacity is prepared for the lower 4 bits data.

Dummy data generator 42 generates dummy data corresponding to 8 sync. blocks, i.e. 85 bytes×8 words.

At multiplexer 43, the upper 20 bits audio data tapped off from C2 adding section 45, the lower 4 bits audio data from C2 adding section 41, and the dummy data from dummy data generator 42 are multiplexed. The multiplexed audio data tapped off from multiplexer 43 forms 72(=4×18) sync. blocks in total per channel and field. One field contains 12 tracks, thus 6 sync. blocks per channel are recorded.

Selector 48 selects the output from multiplexer 43, and outputs the selection result as audio data 61. Multiplexer 49 multiplexes audio data 61 and video data 25.

The multiplexed video and audio data are divided into a number of recording channels, i.e., four channels, and are added an ID number at ID adding section 50. The ID number is added to respective sync. blocks which is the minimum unit in recording/playing back. The ID number is assigned for identifying a type and an order of the sync. blocks. The processes after ID adding section 50 are carried out for respective recording channels.

The definition of the ID number to be added is the same as described in FIG. 6 of the first embodiment.

Figure 15:
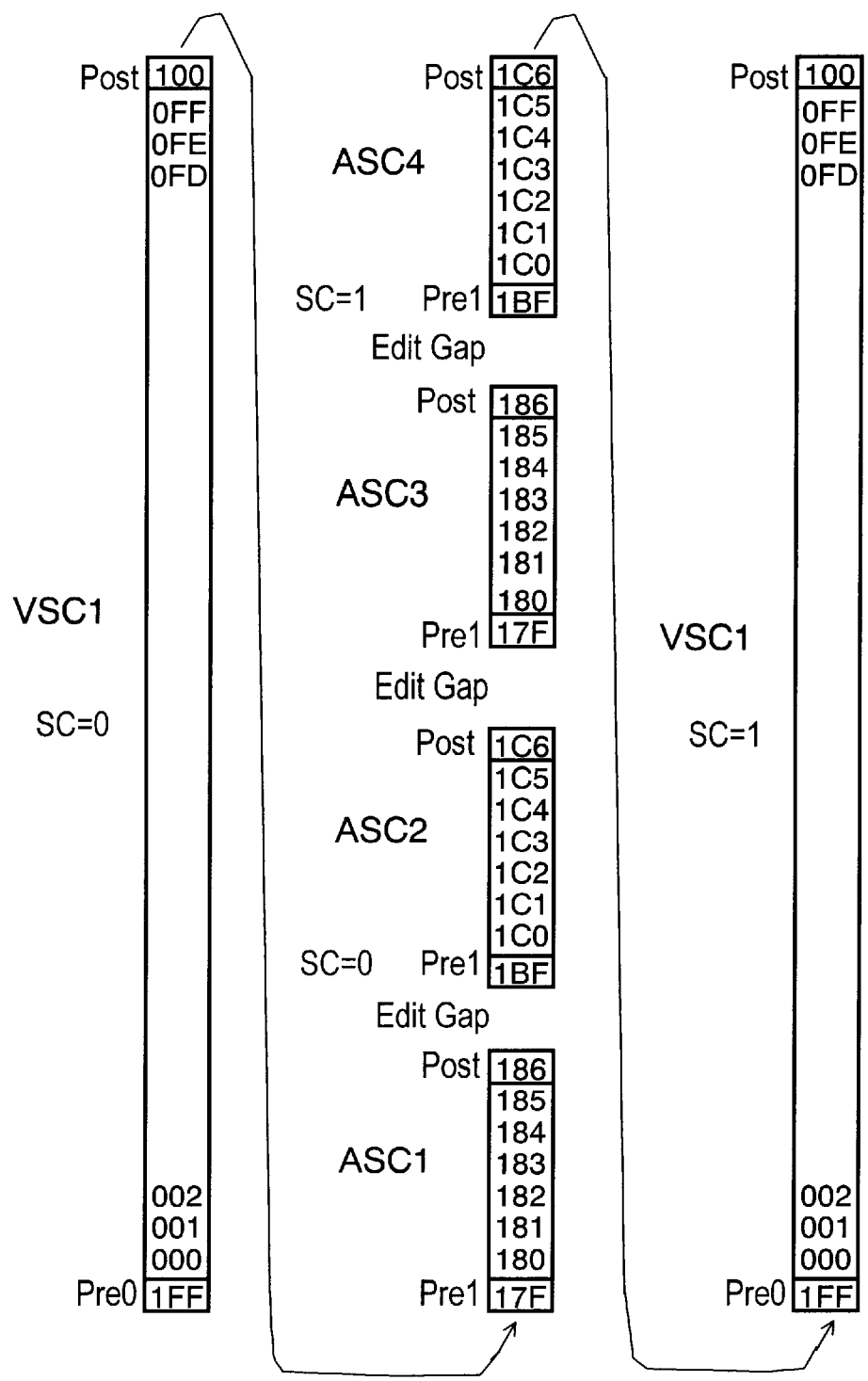
FIG. 15 shows ID numbers assigned to respective sync. block in the record/playback device.

A block No. is added to each sync. block. FIG. 15 details the block No. The block No. to be added to 4 sync. blocks on first half in the audio sector (ASC) are the same numbers as the ID Nos. shown in FIG. 7. In other words, in the ID Nos., block Nos. are from 180*h* to 183*h*, or from 1C0*h* to 1C3*h*. On the other hand, 2 sync. blocks on second half in each sector are assigned other numbers than available ones shown in FIG. 7. In other words, in the ID Nos., block Nos. are from 184*h* to 185*h* and from 1C4*h* to 1C5*h*. The blocks bearing the same ID Nos. are identified with sector Nos.

In the first half 4 sync. blocks of each sector, the upper 20 bit audio data is recorded in the same format as the first embodiment. In the second half 2 sync. blocks of each sector, the lower 4 bits audio data and the dummy data are recorded.

The output from ID adding section 50 is fed into recording processor 230, and processed in the same way as the first embodiment. Thus the structure of the inner code block is the same as shown in FIG. 8. The bit rate of the recorded signal increases by several percent comparing with recorded 60i signal in the first embodiment. Thus multiplexer 49, ID adding section 50 and the recording processor can process the signal faster for that. In other words, the second format can be processor N2 times faster than the first format (N2 is a ratio of recorded data quantity per field in the second format vs. in the first format). The third format can be processed N3×FR times faster than the first format (N3 is a ratio of recorded data quantity per field in the first format vs. in the first format, and FR is a ratio of frame frequency of the third format vs. of the first format).

Figure 16:
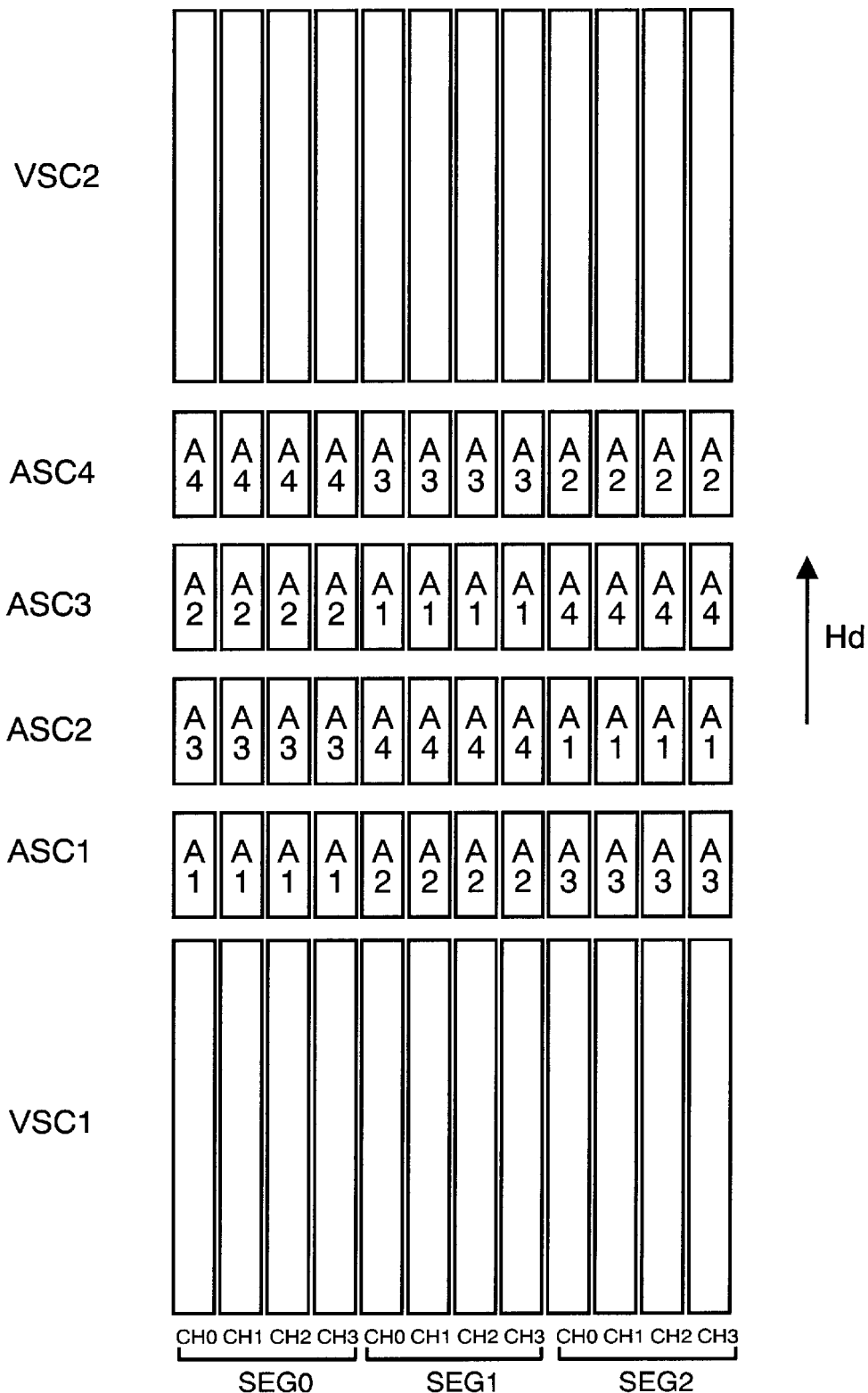
FIG. 16 shows recording-track-patterns in the record/playback device.

FIG. 16 shows recording track patterns. Each track is divided into 2 video sectors (VSC1, VSC2) and 4 audio sectors (ASCs1–4). Each video sector is formed of 256 sync. blocks and each audio sector is formed of 6 sync. blocks. Between the video sector and audio sector, and between respective audio sectors, edit gaps are provided for editing. In FIG. 16, reference marks A1, A2, A3, A4 represent channel 1, channel 2, channel 3, channel 4 of an audio signal respectively. Each audio sector has the same channel arrangement as the format shown in FIG. 5 in the first embodiment.

The placement of an audio channel to each audio sector is changed segment by segment, so that a specific channel is prevented from incurring intensive errors when some damage occurs on the tape in longitudinal direction.

When the tape recorded as discussed above is played back with the VCR in accordance with the first embodiment, the upper 20 bits audio data recorded in a first half 4 sync. blocks among the sync. blocks recorded in each audio sector can be played back because of the following reasons:

1. the ID No. assigned to the sync. block is the same; and
2. the methods of shuffling and adding the outer code are the same. On the other hand, the lower 4 bits audio data is treated as an error and neglected because of a different ID No. In this case, the frequency of reproduced signal played back from the tape increases by several percent; however, the VCR has a program-playback-function which can playback a tape in a high-speed-playback mode within ±50 times or varying tape-playback speed by around 15%. Therefore, the video signal and audio signal can be played back without any problems.

When the tape recorded in accordance with the first embodiment is played back with the VCR in accordance with this third embodiment, the upper 20 bits audio data recorded in each audio sector can be played back as they are because the ID Nos. assigned to the sync. blocks are the same. Therefore, upward compatibility of the format can be maintained. In this case, 0 (zero) is inserted in the lower 4 bits, and the data of 24 bits are played back. No deterioration in sound quality is expected, and naturally, the video signal of 60$i$ signal can be played back.

The case when input terminal 22 receives the 24$p$ signal is described here inafter.

A video signal is processed in video processor 210, and the process is the same as in the first embodiment, thus the description thereof is omitted here.

Next, processing an audio signal of this case is described. As same as the case of the 60$i$ signal, a digital audio signal is fed into input terminal 20, 21. Input section 4, 5 carry out the channel separation as same as the first embodiment.

Shuffling section 46 shuffles the audio data in a unit of field time channel by channel. C2 adding section 47 adds an outer code parity (C2) to shuffled audio data channel by channel.

Figure 17:
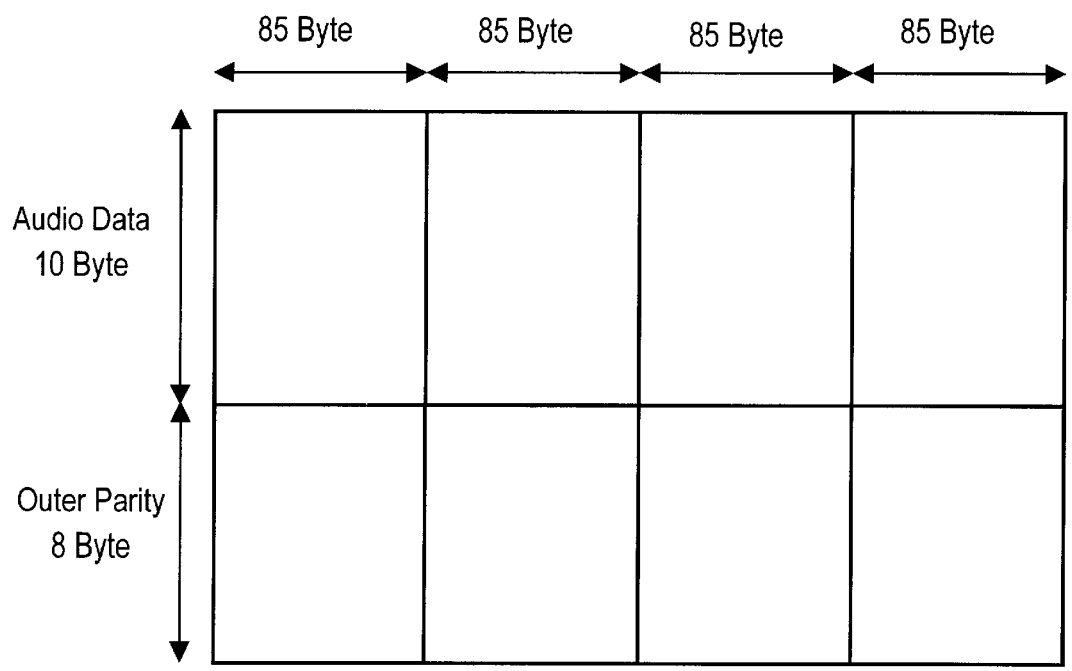
FIG. 17 shows a structure of product code block (24$p$ signal) of an audio signal in the record/playback device.

FIG. 17 shows a structure of a product code formed of an outer code and inner code of audio data per channel and field. The vertical direction represents an outer code block, and the horizontal direction represents an inner code block. An inner code parity (C1) of the inner code block is not shown in FIG. 17. The outer code is RS(18, 10), in other words 10 bytes of outer code parity (C2) is added to every 8 bytes of audio data.

As shown in FIG. 17, the audio data of 1120 samples per channel and field can be recorded, where 1120=85/3×4×10. A number of samples per channel and field of an input audio signal is 48000/48=1000 samples at frame frequency of 24 Hz (field frequency 48 Hz). Therefore, an enough recording capacity is prepared.

Selector 48 selects an output from C2 adding section 47, and outputs audio data 61. Multiplexer 49 multiplexes audio data 61 and video data 25.

Audio data 61 to be multiplexed forms 72 sync. blocks per channel and filed. As FIGS. 14 and 17 illustrate, the data amount per field of audio data to be multiplexed is the same in recording the 60$i$ signal and 24$p$ signal.

The processes at ID adding section 50 and recording processor 230 after multiplexer 49 are the same as the case when a 60$i$ signal is input. The process speed is multiplied by 24/30 to the speed when the 60$i$ signal is input. At the same time, the rotating speed of the rotary drum and the tape speed are also multiplied by 24/30, so that track width and slant recorded on the tape become the same.

Figures 13A, 13B:
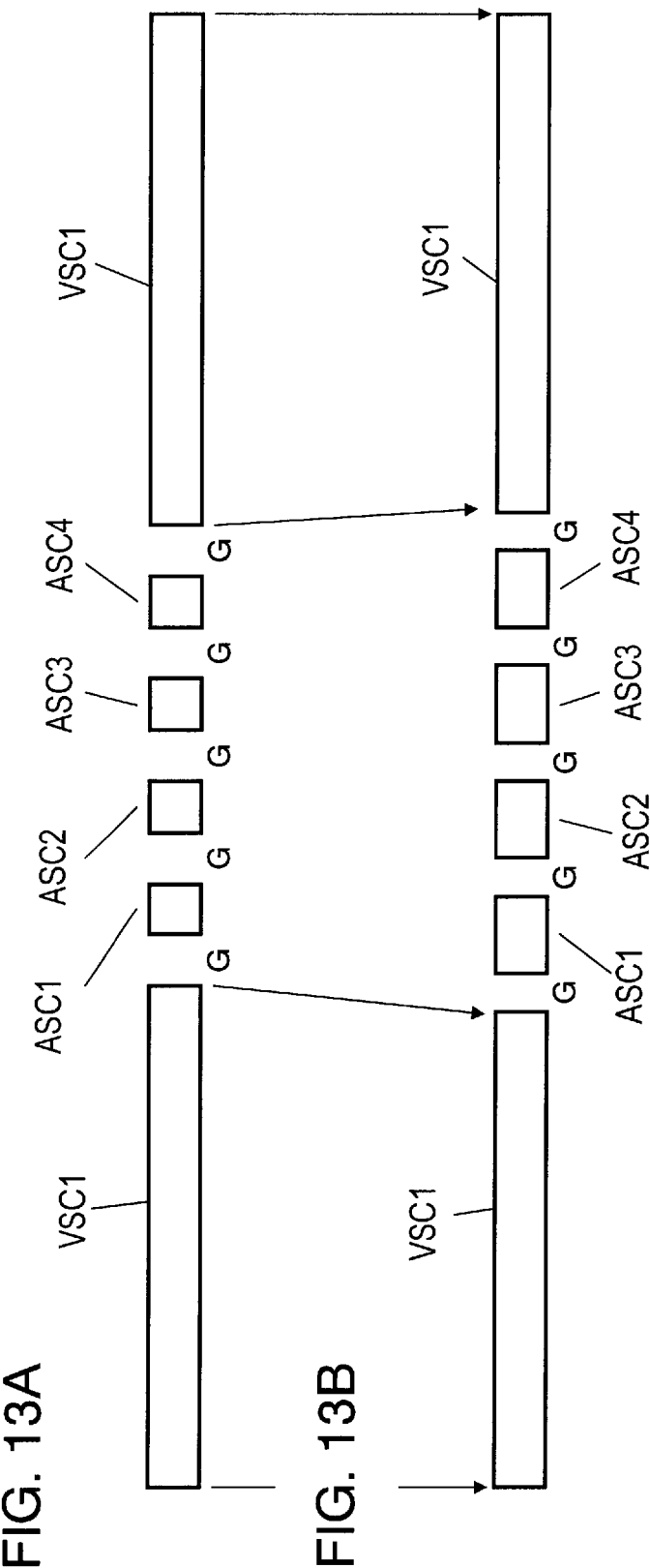
FIGS. 13A–13B shows a comparison the track patterns in the third embodiment with that in the first embodiment.

FIG. 13A shows a track pattern of the first embodiment, and FIG. 13B shows a track pattern of this third embodiment in order to illustrate the difference therebetween. Reference mark "G" represents an edit gap. In this embodiment, the bit rate of recorded signal is raised, i.e., record length of VSC1 and VSC2 become shorter than those in FIG. 13A. Between VSC1–VSC2, as shown in FIG. 13B, 24 bits audio data and dummy data in the case of 60$i$ signal or 24 bits audio data in the case of 24$p$ signal are recorded.

In the third embodiment discussed above, the block Nos. in the ID No. are the same in the case of 60$i$ signal and 24$p$ signal, however, different ID No. can be assigned.

Instead of inserting the dummy data, metadata—representing an attribute of the signal recorded—can be recorded.

When control data such as metadata is recorded in dummy data area, eight sync. blocks other than the blocks forming an outer code are collected to form a new outer code block, so that error-correcting-capability against errors on the tape further increases. For instance, metadata is recorded in four sync. blocks, and an outer code parity is recorded remained four sync. blocks to form RS (8, 4) code, thereby increasing the error-correcting-capability.

Instead of the video signal of frame frequency 24 Hz, e.g. field frequency 50 Hz can be employed. In this case, the outer code RS (18, 10) of audio data is employed, so that an enough recording area can be prepared.

A memory capacity for realizing shuffling section 46 and C2 adding section 47 is greater than the sum of memory capacities used by shuffling section 44 and C2 adding section 45 plus those used by shuffling section 40 and C2 adding section 41. Therefore, shuffling sections 40, 44 and 46 can commonly share the memory, and also C2 adding section 41, 45 and 47 can commonly share the memory. In this case, multiplexer 43 and selector 48 are not needed.

The third embodiment proves that the recording wavelength on the tape is the same for both the cases when a 24$p$ signal is recorded and when a 60$i$ signal is recorded, which allows the designing of a device to be easier and the circuit structure to be simpler.

Further, a number of outer code parities to be added to the audio data is the same for both the cases when a 60$i$ signal is recorded and when a 24$p$ signal is recorded, which allows the error-correcting-circuit to be commonly used. As a result, the cost of the device can be lowered.

When a 60$i$ signal is recorded, dummy data is inserted, so that a number of sync. blocks to be recorded is the same as the case when a 24$p$ signal is recorded. Therefore, identical hardware from multiplexer 49 to modulator 12 can be used for both the cases.

In each audio sector, a number of sync. blocks is increased, so that the audio sector is expanded sequentially in the track direction. Thus no new edit gaps are required. As a result, an increment of the recording frequency can be minimized.

(Exemplary Embodiment 4)

Figure 18:
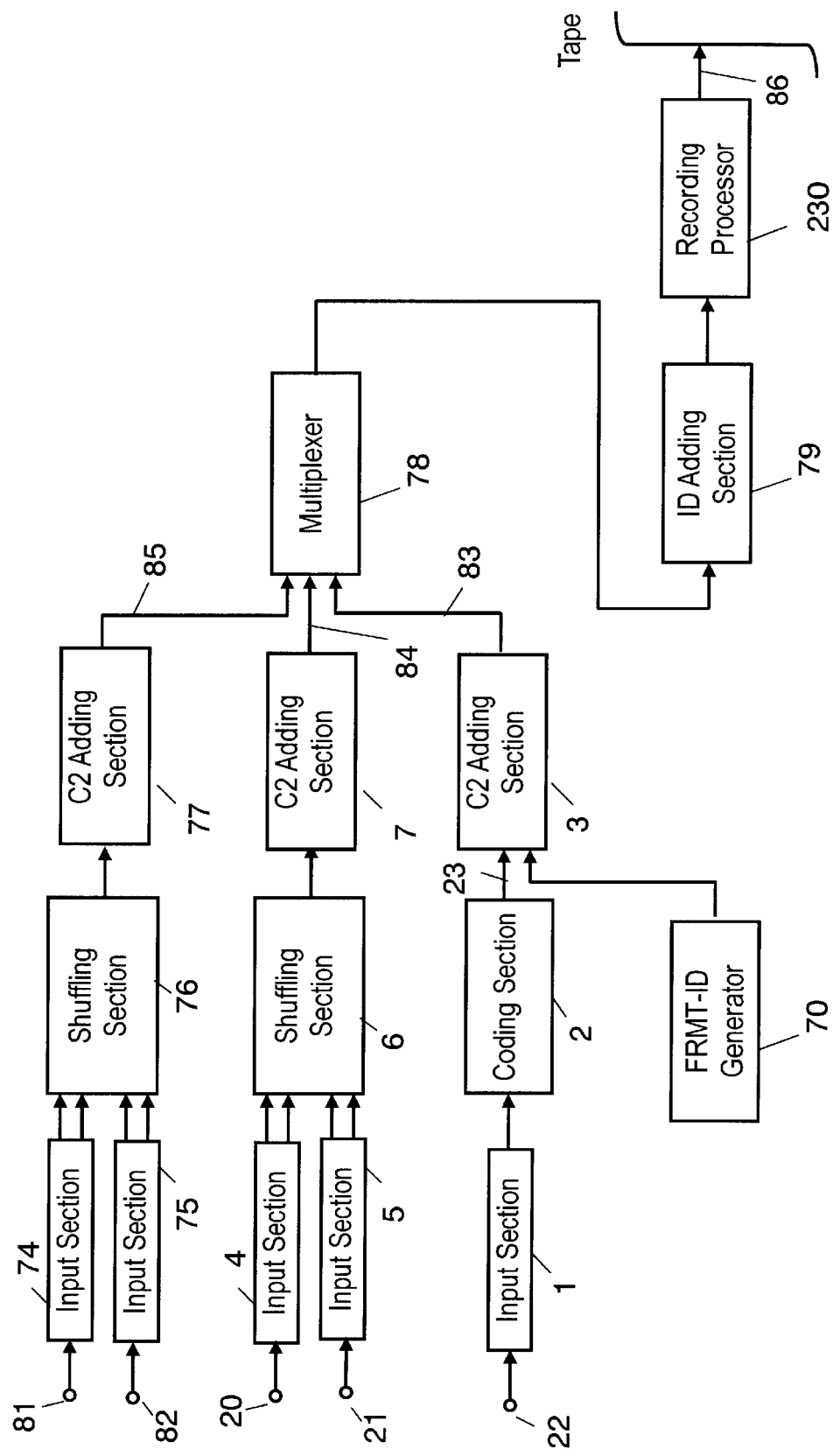
FIG. 18 is a block diagram illustrating a record/playback device in accordance with a fourth exemplary embodiment.

FIG. 18 is a block diagram illustrating a digital VCR that records/plays back a video signal of HDTV together with an audio signal of 8 channels. The video signal is specified as 1125 scanning lines, 1080 active scanning lines, 60 Hz field frequency (hereinafter referred to as 60I signal.)

In FIG. 18, the blocks bear the same reference marks as those in FIG. 1 work in the same manner as in the first embodiment. The head placement is the same as those in FIG. 3, and the track pattern on the tape is the same as that in FIG. 4, i.e., one field period is formed by 4 channels and 3 segments, namely 12 tracks in total.

Input terminal 22 receives a 60i signal, and input section 1 outputs digital-video-data to be recorded. Coding section 2 compresses the video data to ¼ using DCT method. C2 adding section 3 provides the compressed data with a format identifying signal, and then an outer code parity (C2) for correcting an error. The format identifying signal is supplied from FRMT-ID generator 70 for identifying a number of audio sectors and a number of audio channels.

Input terminal 20 receives channel 1 and channel 2 of digital audio signals specified by AES/EBU. Input terminal 21 receives channel 3 and 4 of the digital audio signals. Input terminal 81 receives channels 5 and 6 of the digital audio signals, input terminal 82 receives channels 7 and 8 of the digital audio signals. The sample frequency of the audio signal is 48 kHz, and a number of quantizing bits is 20.

At input sections 4, 5, 74 and 75, channels are separated individually, and audio data to be recorded are taken out. Outputs from input sections 4 and 5 are fed into shuffling section 6. Shuffling sections 6 and 76 provide the audio data supplied from respective channels with shuffling. C2 adding sections 7 and 77 add C2 to the shuffled data and output the data as audio data 84 and 85. The shuffling method at shuffling sections 6 and 76 are the same as in the case of 60i signal shuffled in the first embodiment. Audio data 84 and 85 added C2 are transmitted to multiplexer 78.

Next, at multiplexer 78, video data 83 is multiplexed with audio data 84 and 85 on time-axis. The multiplexed video data and audio data are divided into a number of recording channels, i.e., four channels. Then ID adding section 79 adds ID Nos. to those data. The definition of the added ID Nos. are the same as that described in FIG. 6.

Figure 20:
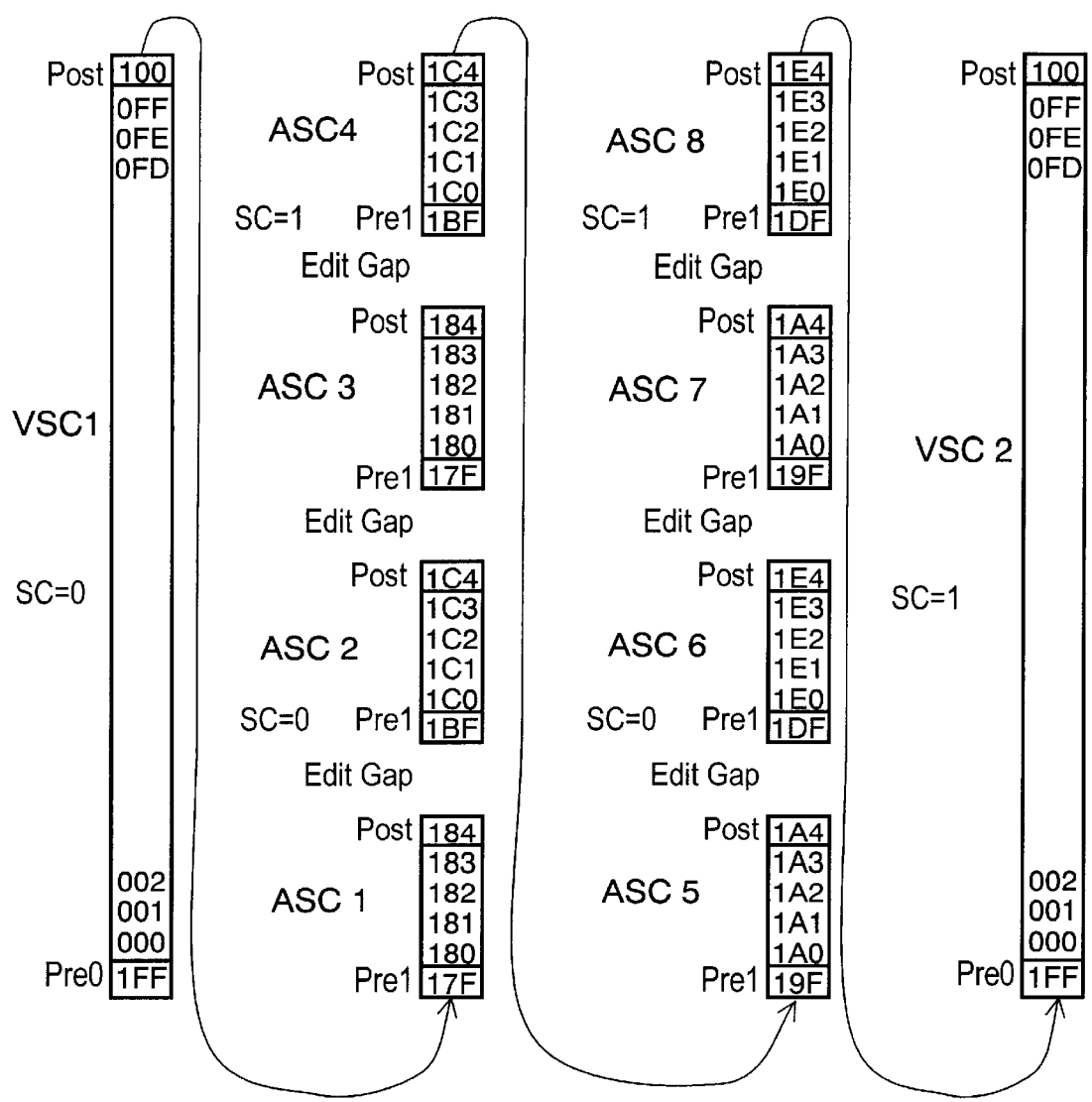
FIG. 20 shows ID numbers assigned to respective sync. block in the record/playback device.

An ID No. to be added to an audio sector (ASC) at ID adding section 79 is hereinafter described. As shown in FIG. 20, ASCs 1–4 are added the same number as the ID Nos. shown in FIG. 7 in the first embodiment. In other words, block Nos. of the ID No. are from 180$h$ to 183$h$ or from 1C0$h$ to 1C3$h$. On the other hand, ASCs 5–8 are added the Nos. different from the ID Nos. shown in FIG. 7, namely, the block Nos. of the ID No. are from 1A0$h$ to 1A3$h$ or from 1E0$h$ to 1E3$h$. The blocks added the same block Nos. are identified with sector Nos.

An output from ID adding section 79 is fed into recording processor 230 and undergoes the same process as the first embodiment, then record signal 86 is recorded on the tape. In this case, a bit rate of the record signal should be raised comparing with the case when a 60i signal is recorded in the first embodiment. Thus the process speeds at multiplexer 78, ID adding section 79 and recording processor 230 are raised for that.

Figure 21:
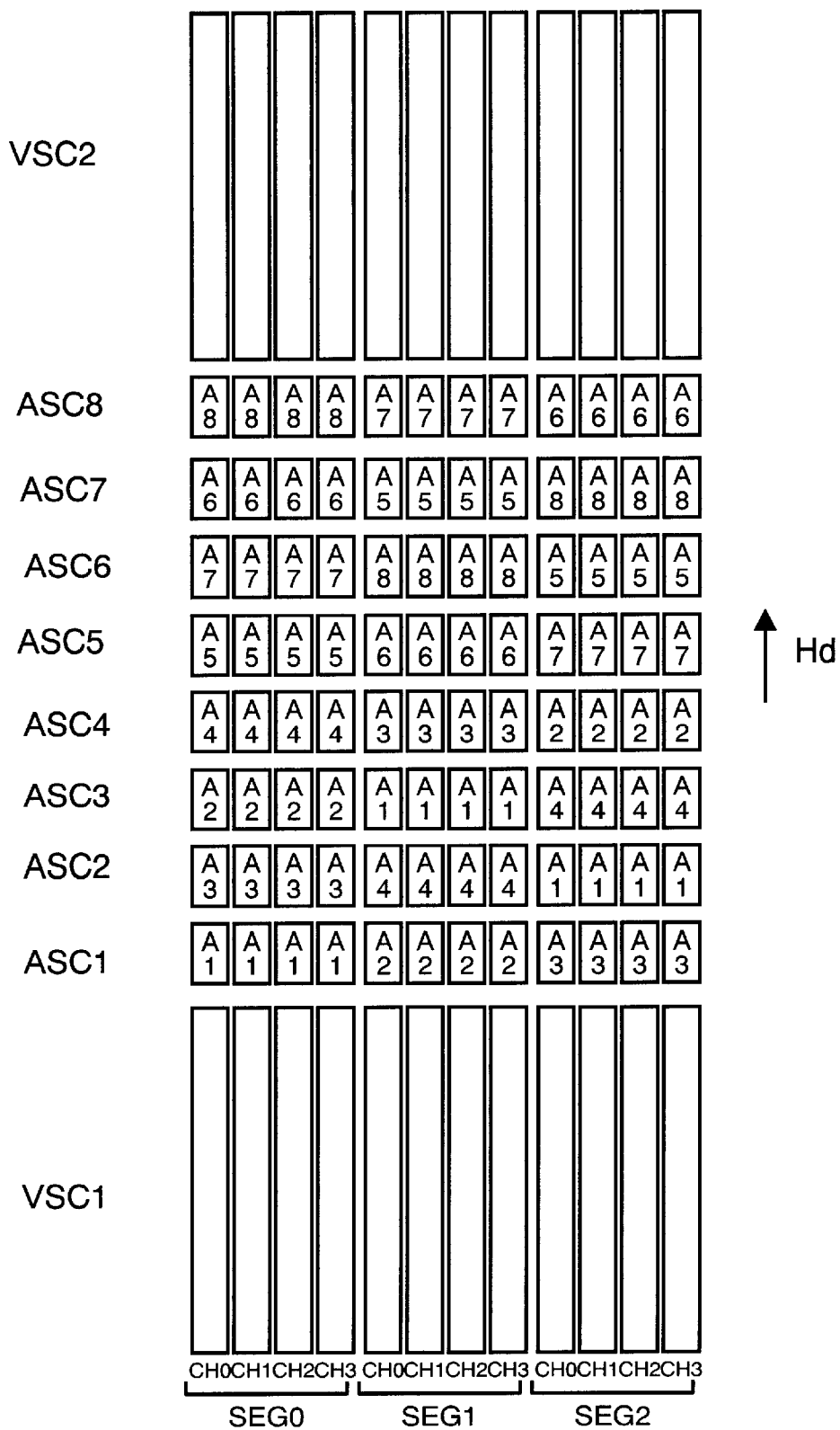
FIG. 21 illustrates a recorded track pattern in the record/playback device.

FIG. 21 shows record track patterns. VSC1, VSC2 and ASCs 1–8 are formed. Reference marks A1, A2, A3, A4, A5, A6, A7 and A8 represent the channels 1–8 of an audio signal.

Between a VSC and an ASC, and between respective ASCs, an edit gap is provided. In ASC1–ASC4 out of eight ASCs, channels are arranged in the same manner as the first embodiment. In ASC5–ASC8, the audio data of channels 5–8 are recorded. As same as ASC1–ASC4, the arrangement of audio channels in each ASC are changed in ASCs5–8 segment by segment. As a result, a specific channel is prevented from incurring intensive errors when some damage occurs on the tape in longitudinal direction.

Four sync. blocks are placed in each ASC, and 256 sync. blocks are placed in each VSC. As already described, the ID No. added to the sync. blocks of ASC1–ASC4 are identical to the format of the 60i signal in the first embodiment. The ID Nos. added to ASC5–ASC8 are different from the 60i signal format in the first embodiment.

Figures 19A, 19B:
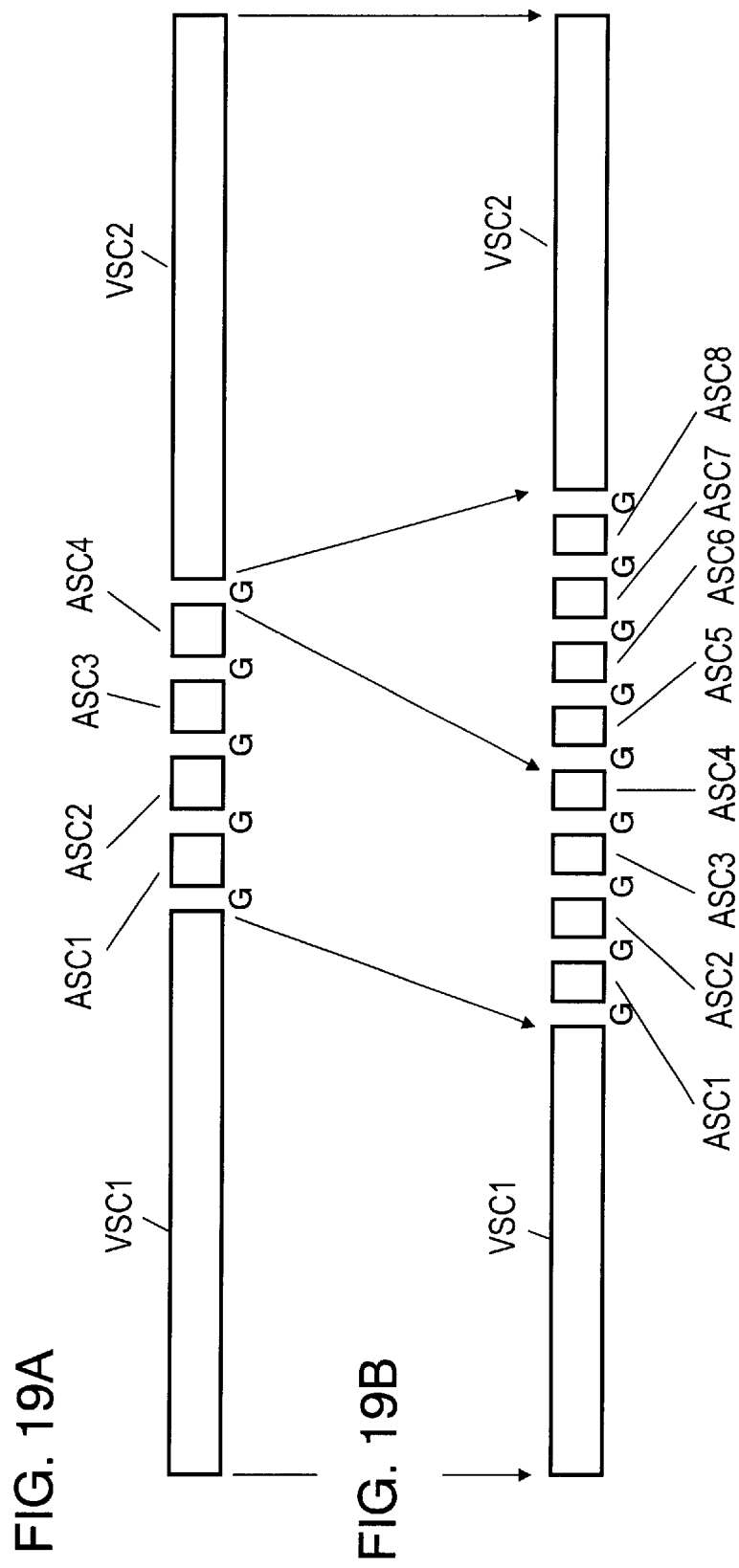
FIGS. 19A–19B show comparison of track patterns in the fourth embodiment with that in the first embodiment.

FIG. 19A shows a track pattern of 60i signal in accordance with the first embodiment, and FIG. 19B shows a track pattern in accordance with this fourth embodiment. Reference mark "G" represents an edit gap. In this embodiment, a recorded signal is recorded by raising its bit rate, and the sector for audio data of channels 5–8 is placed between ASC4-VSC2.

When the tape recorded as discussed above is played back with the VCR in accordance with the first embodiment, the audio data of channels 1–4 recorded in ASCs1–4 can be played back because the ID Nos. assigned to the sync. blocks are the same. On the other hand, the audio data of channels 5–8 are treated as an error and neglected because of different ID Nos. In this case, the frequency of reproduced signal played back from the tape increases by several percent; however, the VCR has a program-playback-function which can playback a tape by varying a tape-playback-speed by around 15% or high-speed-playback within ±50 times. Therefore, the video signal and audio signal can be played back without any problems.

When the tape recorded 60i signal in accordance with the first embodiment is played back with the VCR in accordance with this fourth embodiment, the audio data of channels 1–4 recorded in ASCs 1–4 can be played back because the ID Nos. assigned to the sync. blocks are the same.

In this embodiment, audio data increased is inserted into the edit gap between ASC4 and VSC2; however, it can be inserted not only into this edit gap but also between VSC1 and ASC1. The data increased is not necessarily inserted in the form of four sequential sectors but each one sector can be inserted into edit gaps between each ASC. The data increased may be placed before VSC1 or after VSC2.

The format identifying signal is inserted into coded video data; however, it can be inserted into, e.g., audio data. FRMT-ID generator 70 is not necessarily provided. Without the format ID signal, a tape format can be identified by detecting an ID No.

Audio data of 8 channels are recorded; however, audio data of four or more than four channels may be recorded.

Instead of an audio signal of a channel, meta data indicating an attribute of a signal recorded can be used.

(Exemplary Embodiment 5)

Figure 22A:
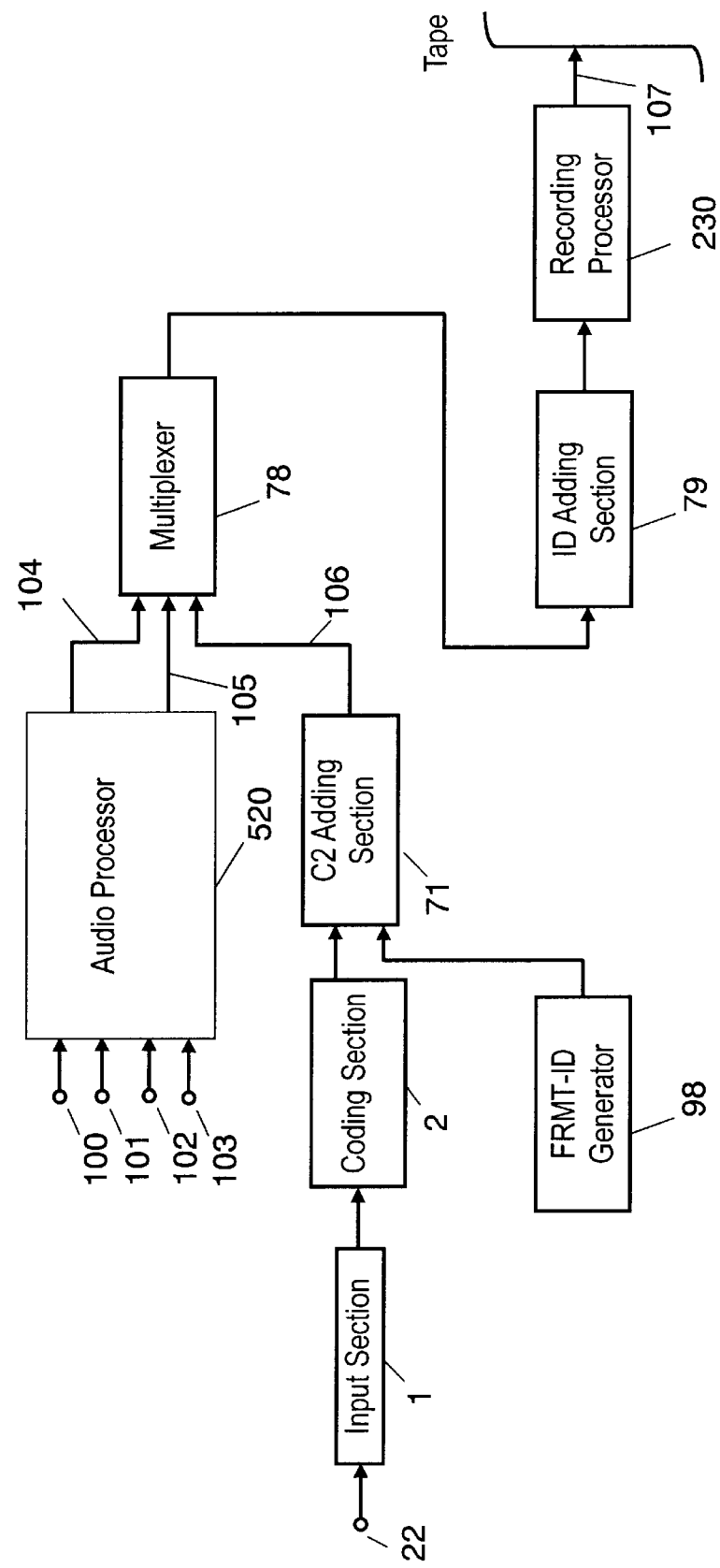
FIG. 22A is a block diagram illustrating a structure of a record/playback device in accordance with a fifth exemplary embodiment of the present invention.
Figure 22B:
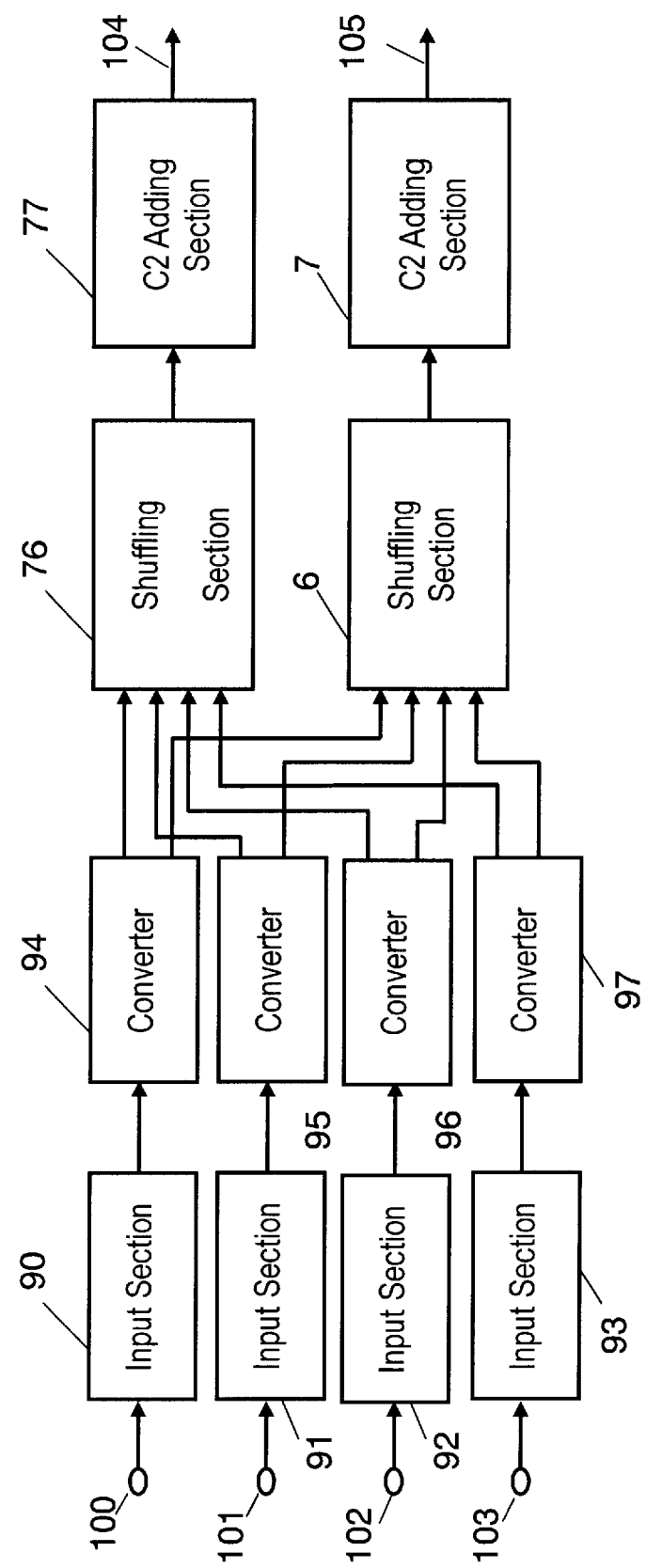
FIG. 22B is a detailed block diagram of audio processor 520 shown in FIG. 22A.

FIG. 22A is a block diagram of a record/playback device in accordance with the fifth exemplary embodiment of the present invention. FIG. 22B details audio processor 520 shown in FIG. 22A.

In FIGS. 22A and 22B, the blocks bearing the same reference marks as in FIG. 1 work in the same manner as the first embodiment, and the blocks bearing the same reference marks as in FIG. 18 work in the same manner as the fourth embodiment.

In this fifth embodiment, an audio signal of 4 channels, sampled by 96 kHz and quantized by 20 bits, is converted into an audio signal of 8 channels, 48 kHz sampling frequency and 20 quantizing bits, then a video signal as well as the audio signal is recorded in accordance with the fourth embodiment.

In FIGS. 22A and 22B, digital audio signals of channels 1–4, 96 kHz sampling by, a number of quantizing bits 20 are fed into input sections 90, 91, 92 and 93 via input terminals 100, 101, 102 and 103.

In input section 90, 91, 92 and 93, audio data to be recorded is taken out and fed into converters 94, 95, 96 and 97, which converters split the input audio data into two streams. To be more specific, one stream has even numbered samples and the other stream has odd numbered samples arranged in the input sequence. This split produces equivalent audio data of 8 channels. The even numbered samples are supplied to shuffling section 6, and the odd numbered samples are supplied to shuffling section 76. The processes of the audio data after shuffling sections 6, 76 are the same as those in the fourth embodiment, thus the descriptions thereof are omitted. The process of a video signal supplied to input terminal 22 is the same as that in the fourth embodiment. FRMT-ID generator 98 generates a format ID signal which is information such as numbers of audio sectors, audio channels, audio sampling frequencies, and the like.

Figure 23:
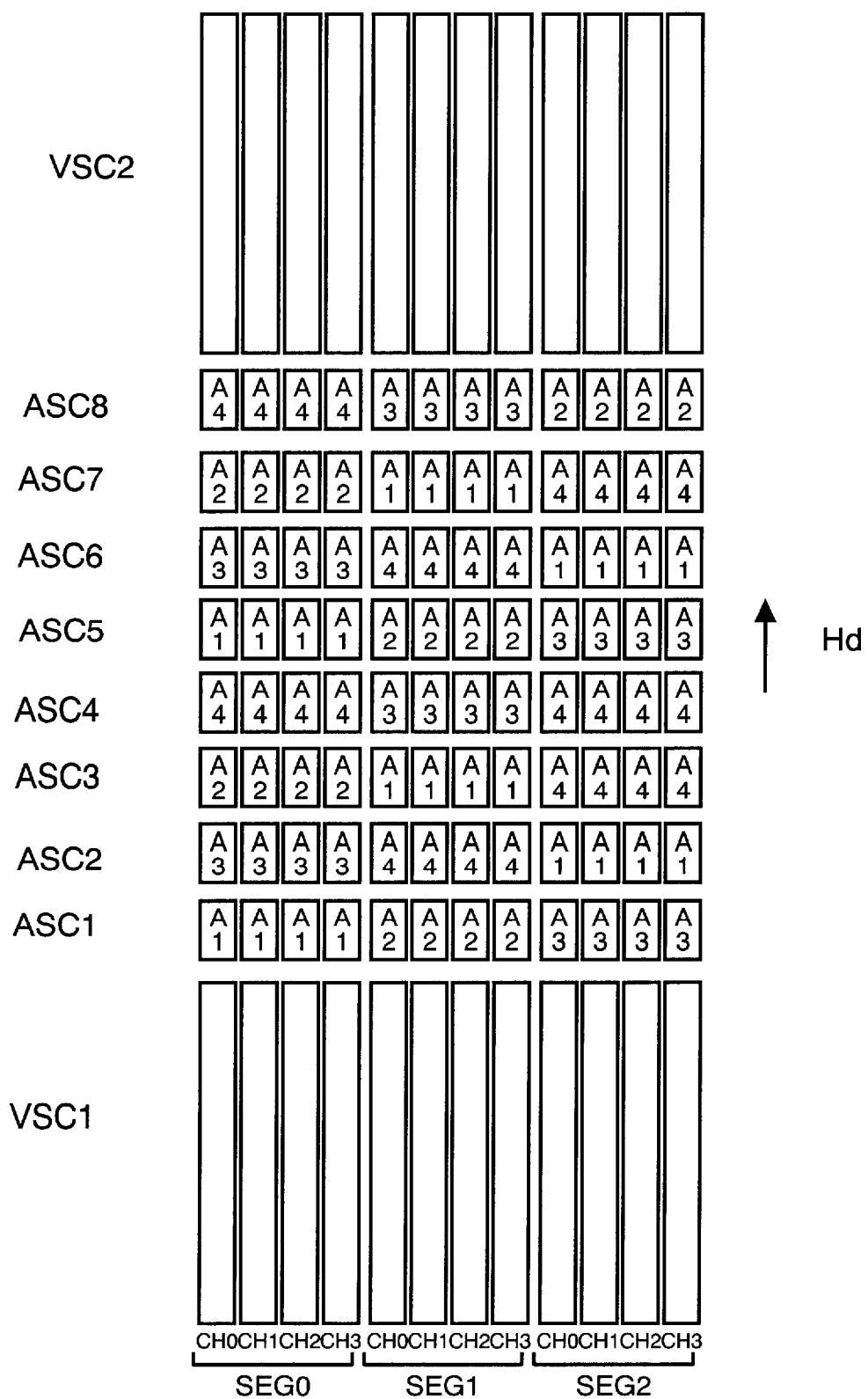
FIG. 23 shows a recorded track pattern in the record/playback device.

FIG. 23 shows a pattern on a tape in accordance with this fifth embodiment. The audio data of channels 1–4 supplied to shuffling section 6 are placed in ASC1–ASC4, and the audio data of channels 1–4 supplied to shuffling section 76 are placed in ASC5–ASC8.

When this tape recorded in the tape format shown in FIG. 23 is played back with the VCR in accordance with the first embodiment, the audio data of channels 1–4 recorded in ASC1–ASC4 can be reproduced as they are because of the same ID Nos. They are played back at 48 kHz clock frequency as if the audio data sampled at 48 kHz are reproduced.

Actually the audio data recorded on the tape was sampled at 96 kHz, and can be handled as if two-channel-data sampled at 48 kHz, so that the audio data can be played back.

In the reversal case, when the tape of the format in accordance with the first embodiment is played back with the VCR of this fifth embodiment, audio data of 4 channels can be played back with ease by determining a number of ASCs. Thus the upward compatibility of the format can be maintained.

In this fifth embodiment, the details of the audio signal supplied to converters 94–97 are as follows:

a number of quantizing bits (C): C=20;

sampling frequency (F3): F3=96 kHz; and a number of channels (N): N=4.

The details of the audio data supplied to shuffling section 6 are as follows:

a number of quantizing bits (A): A=20;

sampling frequency (F1): F1=48 kHz; and a number of channels (L): L=4.

In the same manner, the details of the audio data supplied to shuffling section 76 are as follows:

a number of quantizing frequency (B): B=20;

sampling frequency (F2): F2=48 kHz; and a number of channels (M): M=4.

These details are not limited to this embodiment, but the details may roughly satisfy the following equation (1).

$$F1 \times L \times A + F2 \times M \times B = F3 \times N \times C \qquad (1)$$

When equation (1) is satisfied, audio sectors can be formed on a recording medium without surplus or short of data quantity, so that the recording medium can be used efficiently.

Further, the details not only satisfies equation (1) but also satisfies equation (2), the audio data supplied to shuffling section 6 or 76 can be recorded on the recording medium independently of each ASC channel by channel. In other words, audio data can be edited channel by channel independently.

$$L=M=N, A=B=C \qquad (2)$$

(Exemplary Embodiment 6)

Figure 24A:
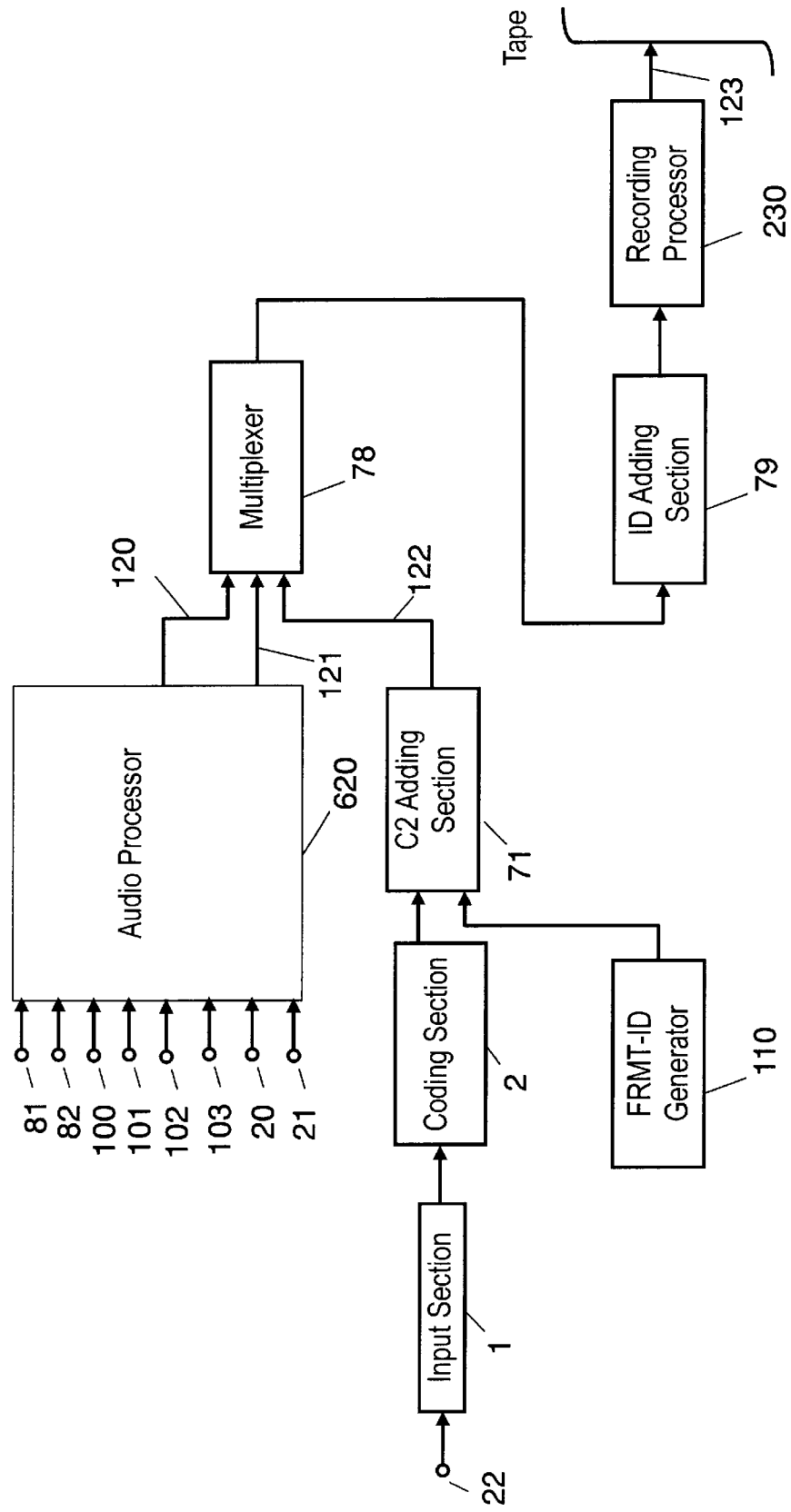
FIG. 24A is a block diagram illustrating a structure of a record/playback device in accordance with a sixth exemplary embodiment of the present invention.

FIG. 24A is a block diagram illustrating a record/playback device in accordance with the sixth exemplary embodiment of the present invention. FIG. 24B details audio processor 620 shown in FIG. 24A.

In FIGS. 24A and 24B, blocks bearing the same reference marks as those in FIGS. 18 and 22 work in the same manner as in the fourth and fifth embodiments, and the blocks bearing the same reference marks as those in FIG. 1 work in the same manner as in the first embodiment.

The head placement is the same as those in FIG. 3, and the track pattern on the tape is the same as that in FIG. 4, i.e., one field period is formed by 4 channels and 3 segments, namely 12 tracks in total.

Input terminal 22 receives an HDTV video signal having 1125 scanning lines, 1080 active scanning lines, and 60 Hz field frequency. The process of the video signal is the same as that in the fourth and fifth embodiments, thus the description thereof is omitted. FRMT-ID generator 110 generates a format ID signal which contains information of a number of audio sectors, audio channels, and audio sampling frequency in accordance with this sixth embodiment. In this case, the information should include whether the audio sampling frequency is 48 kHz or 96 kHz, and a number of audio channels is 4 or 8.

The record/playback device of this sixth embodiment comprises input sections 90–93 and converters 94–97 as same as the fifth embodiment in addition to the structure of the fourth embodiment. It further comprises selectors 111, 112 for selecting the audio data supplied from input sections 4, 5, 74, 75 or the audio data supplied from converters 94–97, then recording those selected audio data.

Input terminals 20, 21, 81, 82 receive the 8-channel audio signal having a 48 kHz sampling frequency and 20 quantizing bits. As shown in FIG. 24B, the audio signal are fed into selectors 111, 112 via input sections 4, 5, 74, 75. Terminals 100–103 receive 4 channels audio signal having 96 Hz sampling frequency and 20 quantizing bits in the same manner as in the fifth embodiment. As shown in FIG. 24B, the audio signal is then fed into coonverters 94–97, where the same process as in the fifth embodiment is provided, then the audio signal is supplied to selectors 111, 112.

Selector 111 selects the outputs from input sections 74, 75 or from converters 94–97, then supplies the selected outputs to shuffling section 76. Selector 112 selects the outputs from output sections 4, 5 or from converters 94–97, then supplies the selected outputs to shuffling section 6.

The processes after shuffling sections 6, 76 are the same as those in the fourth or fifth embodiment.

The process of the video signal fed into terminal 22 is the same as that in the fourth or fifth embodiment.

As discussed above, in this sixth embodiment, the details of the audio signal fed into converters 94–97 are as follows:

a number of quantizing bits (C): C=20;

sampling frequency (F3): F3=96 kHz; and a number of channels (N): N=4.

The details of the audio data supplied from converters 94–97 and fed into shuffling section 6 are as follows:

a number of quantizing bits (A): A=20;

sampling frequency (F1): F1=48 kHz; and a number of channels (L): L=4.

In the same manner, the details of the audio data supplied from converters 94–97 and fed into shuffling section 76 are as follows:

a number of quantizing bits (B): B=20;

sampling frequency (F2): F2=48 kHz; and a number of channels (M): M=4.

These details are not limited to this embodiment, but the details may roughly satisfy the following equation (1).

$$F1 \times L \times A + F2 \times M \times B = F3 \times N \times C \quad (1)$$

When equation (1) is satisfied, audio sectors can be formed on a recording medium without surplus or short of data quantity, so that the recording medium can be used efficiently.

Further, the details not only satisfies equation (1) but also satisfies equation (2), the audio data supplied to shuffling section 6 or 76 can be recorded on the recording medium independently of each ASC channel by channel. In other words, audio data can be edited channel by channel independently.

$$L=M=N, A=B=C \quad (2)$$

The sixth embodiment proves that when audio data having different sampling frequencies or a number of channels are supplied, the audio data can be recorded in the audio sector on a tape channel by channel. This allows the audio data to be edited channel by channel, which improves the convenience of a program production.

Further, since the format ID signal is recorded on the tape, an audio data format can be identified when the tape is played back. For instance, in playing back the tape, an audio signal is determined as the 96 kHz and 4 channels signal by identifying the format ID signal, then the audio data of 96 kHz and 4 channels are supplied. When the audio signal is determined as the 48 kHz and 8 channels signal, the audio data of 48 kHz and 8 channels are supplied.

In this embodiment, in the case of recording the 96 kHz and 4 channels audio data, or in the case of the 48 kHz and 8 channels audio data, the audio data of 4 channels can be played back with the VCR in accordance with the first embodiment.

(Exemplary Embodiment 7)

Figure 25:
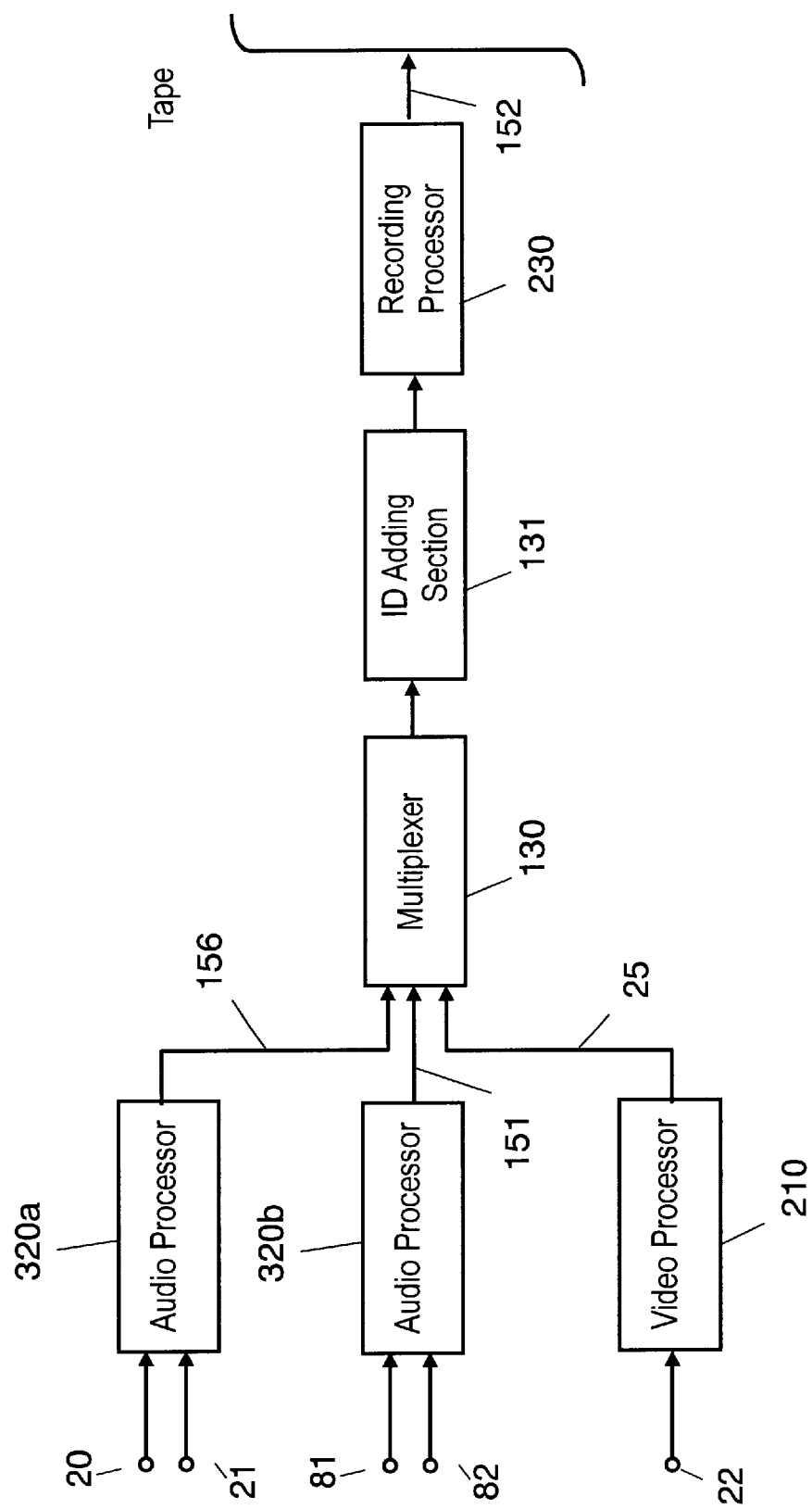
FIG. 25 is a block diagram illustrating a structure of a record/playback device in accordance with a seventh exemplary embodiment of the present invention.

FIG. 25 is a block diagram illustrating a record/playback device in accordance with the seventh exemplary embodiment of the present invention.

In this seventh embodiment, the digital audio signal of 8 channels specified by AES/EBU is recorded/played back together with a 60*i* signal or 24*p* signal. The sampling frequency of the audio signals is 48 kHz, a number of quantizing bits is 20.

In FIG. 25, blocks bearing the same reference marks as those in FIG. 1 work in the same manner as in the first embodiment, and blocks bearing the same reference marks as those in FIG. 12 work in the same manner as in the third embodiment.

The head placement is the same as those in FIG. 3, and track pattern on the tape is the same as that in FIG. 4, i.e., one field period is formed by 4 channels and 3 segments, namely 12 tracks in total.

In FIG. 25, terminal 22 receives a 60*i* signal or a 24*p* signal, which undergoes the same process at video processor 210 as in the first embodiment. Video processor 210 outputs the signal to multiplexer 130.

Input terminal 20 receives channels 1, 2 of an audio signal, and terminal 21 receives channels 3, 4 of the audio signal. Terminals 81, 82 receive channels 5, 6 and 7, 8 respectively.

The audio signals of 4 channels fed into terminals 20, 21 are processed by audio processor 320*a*, and those fed into terminals 81, 82 are processed by audio processor 320*b*. Audio processors 320*a*, 320*b* carry out the same process as audio processor 320 did in the third embodiment. The signals processed by processors 320*a*, 320*b* are fed into multiplexer 130.

Multiplexer 130 multiplexes audio data 156 of channels 1–4, audio data 151 of channels 5–8 and video data 25.

The multiplexed video and audio data are divided into a number of recording channels, i.e., four channels, and then added ID Nos. at ID adding section 131. The definition of the ID Nos. added is the same as described in FIG. 6 of the first embodiment.

Figure 27:
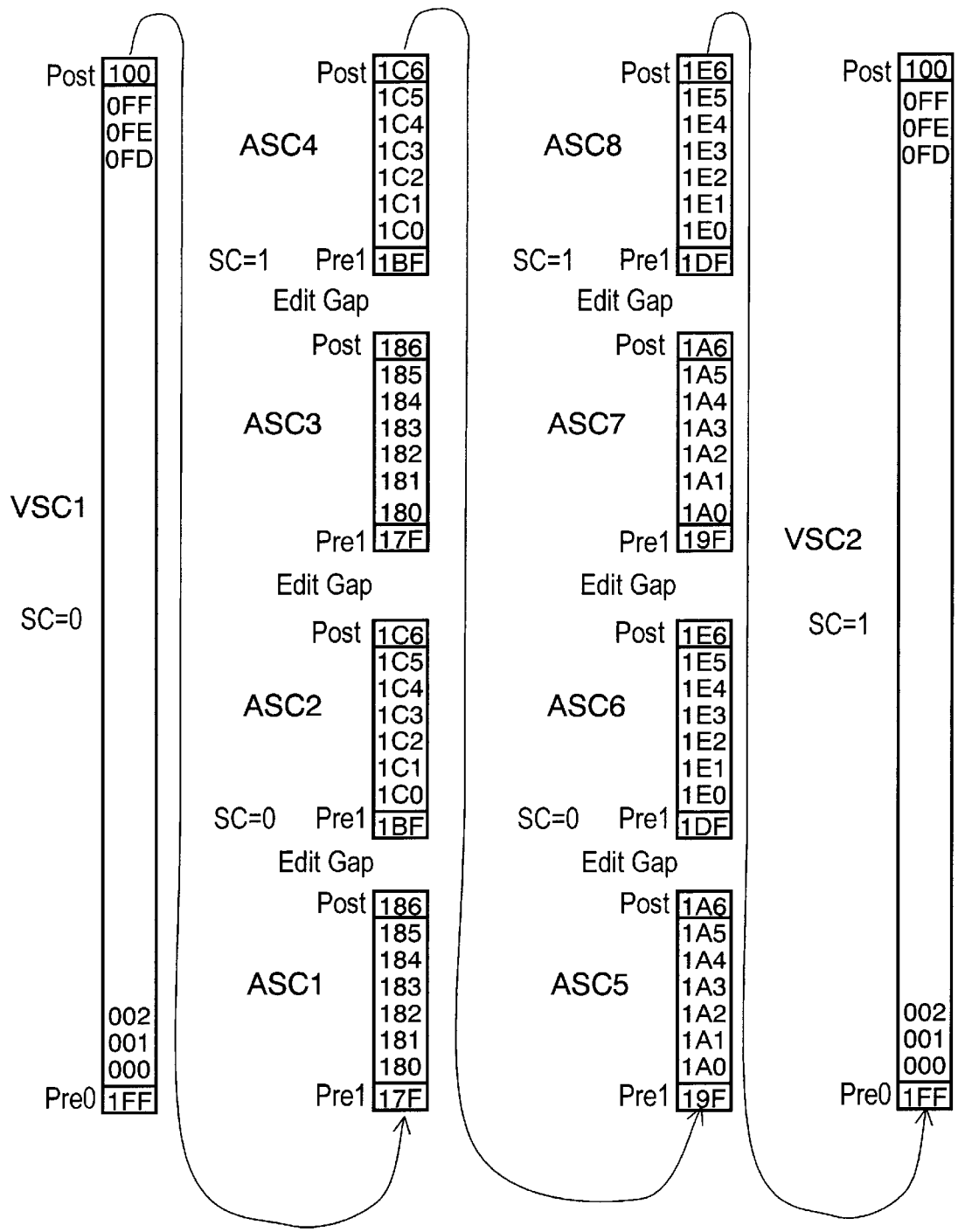
FIG. 27 shows ID numbers assigned to respective sync. block in the record/playback device.

Next, an ID No. to be added to an ASC at ID adding section 131 is described with reference to FIG. 27, which listed block Nos. of the ID Nos. to be added.

In respective sectors of ASCs 1–4, block Nos. assigned to sync. blocks within respective ASCs are the same as in FIG. 15 of the third embodiment. A first half 4 sync. blocks are recorded upper 20 bits of audio data in the same manner as the 60*i* signal in the first embodiment, and a second half 2 sync. blocks are recorded lower 4 bits of audio data and dummy data in the same manner as the third embodiment.

Each sector of ASCs 5–8 are assigned ID Nos. not found in FIG. 7 of the first embodiment. In other words, block Nos. in ID Nos. are 1A0*h*–1A5*h*, 1E0*h*–1E5*h*. The blocks assigned the same block Nos. should be identified with sector Nos. Regarding ASCs 5–8, the first half 4 sync. blocks of each sector is recorded upper 20 bits data of audio data, and the second half 2 sync. blocks are recorded lower 4 bits audio data and dummy data.

The output from ID adding section 131 is fed into recording processor 230, and processed in the same manner as the first embodiment. In this case, the bit rate of recorded signal 152 increases by several percent comparing with that of the 60*i* signal used in the first embodiment. Operating frequencies of multiplexer 130, ID adding section 131, C1 adding section 10, Sync. adding section 11 and modulator 12 are thus increased for that comparing with the 60*i* signal in the first embodiment.

Figure 28:
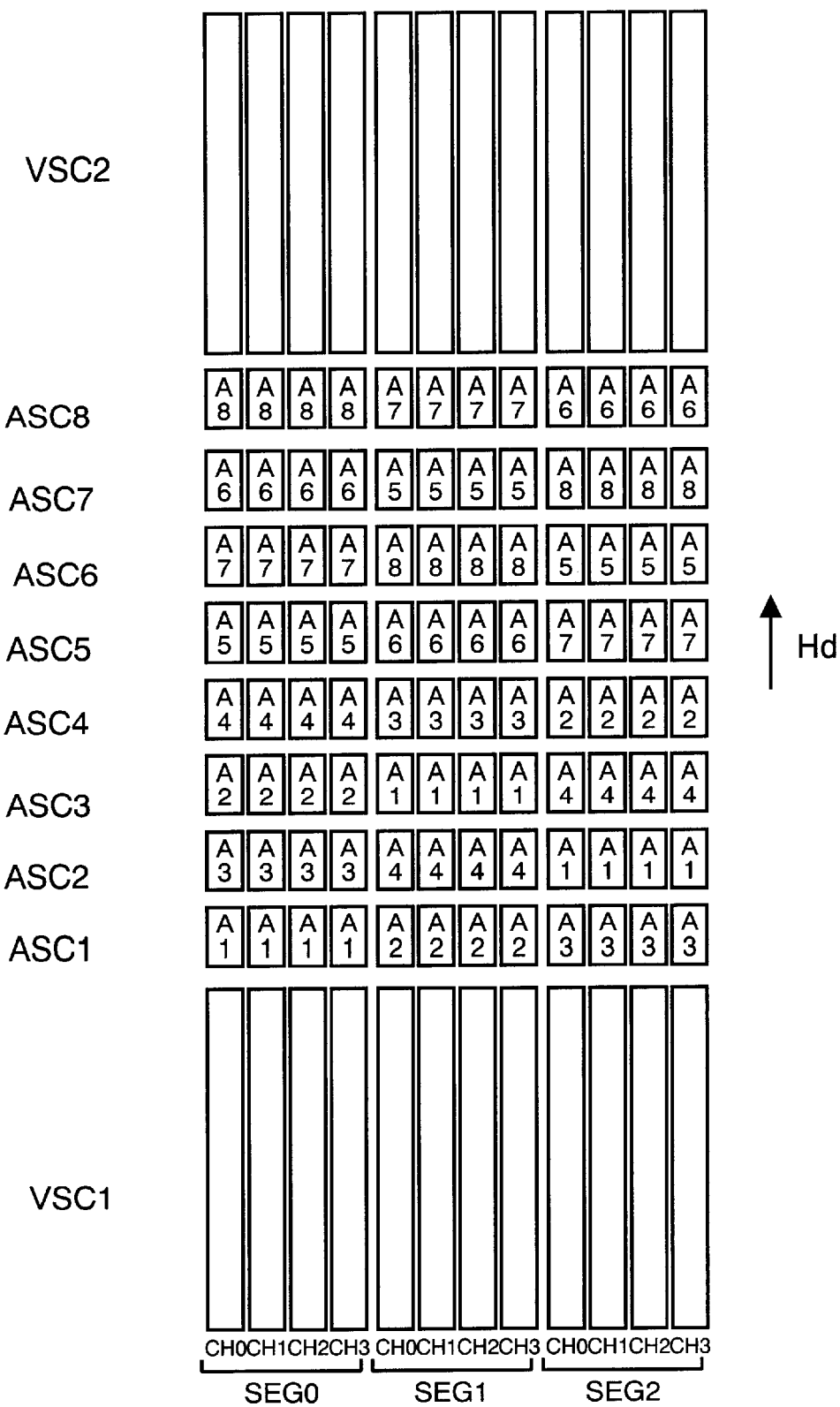
FIG. 28 shows a recorded track pattern in the record/playback device.

FIG. 28 shows recording track patterns on a tape in accordance with the seventh embodiment. As shown in FIG. 28, there are two video sectors VSCs1, 2) and eight audio sectors (ASCs 1–8). Reference marks A1–A8 represent channels 1–8 of an audio signal.

Edit gaps are provided between VSCs and ASCs, and between respective ASCs. Six sync. blocks are placed in each ASC, and 256 sync. blocks are placed in each VSC. As already described, the ID No. added to the first half four sync. blocks of ASC1–ASC4 are identical to the format of the 60*i* signal in the first embodiment. The ID Nos. added to ASC5–ASC8 are different from the 60*i* signal format in the first embodiment.

Figures 26A, 26B:
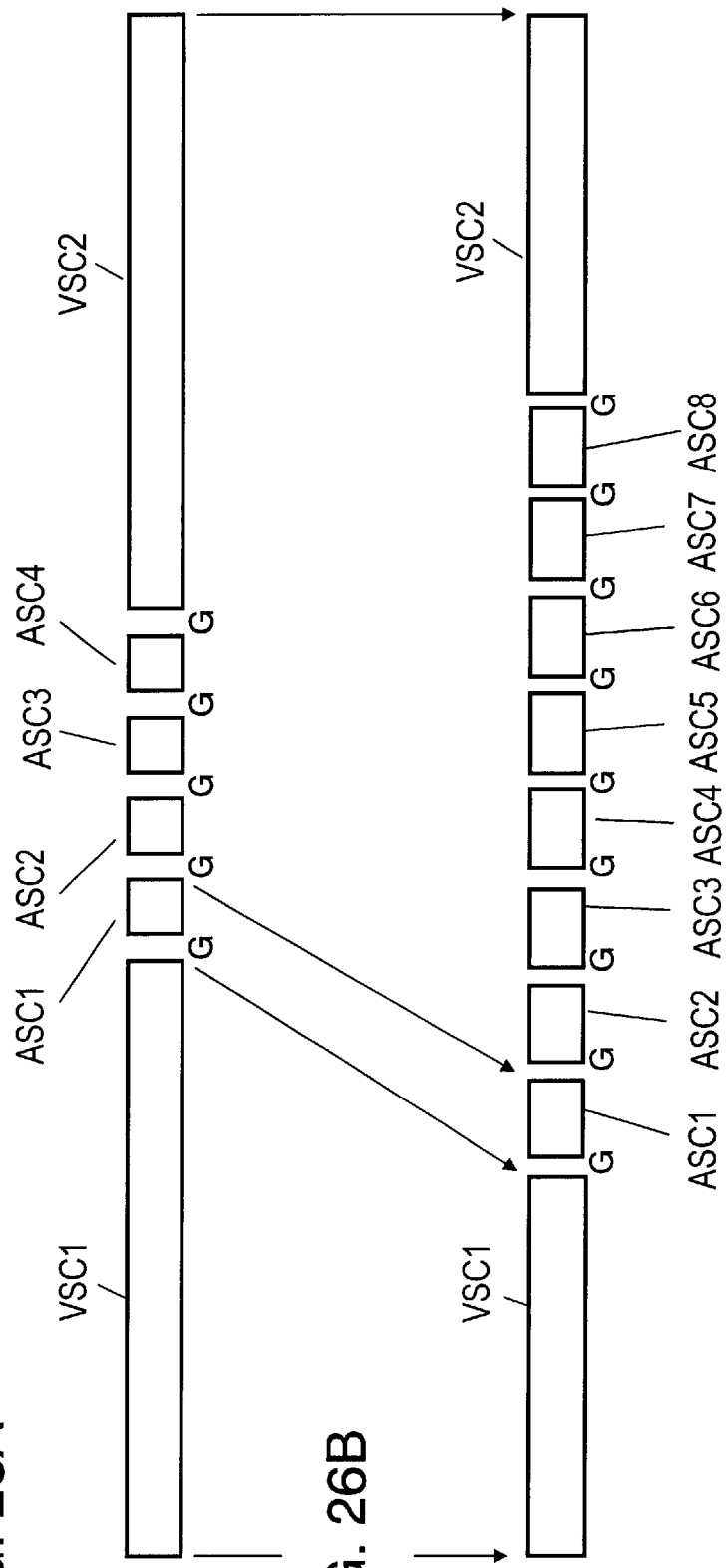
FIGS. 26A–26B show a comparison of track patterns in the seventh embodiment with that in the first embodiment.

FIG. 26A shows a track pattern of the first embodiment, and FIG. 26B shows a track pattern of this seventh embodiment. Reference mark "G" represents an edit gap. In this embodiment, the bit rate of recorded signal is raised, i.e., recorded length of VSC1 and VSC2 become shorter than those in FIG. 26A as same as shown in FIG. 13. Between VSC1–VSC2, as shown in FIG. 26B, 24 bits audio data and dummy data in the case of 60*i* signal or 24 bits audio data in the case of 24*p* signal are recorded.

As discussed above, when the tape where the 60*i* signal and the audio signal are recorded is played back with the VCR used in the first embodiment, the audio data of upper 20 bits recorded in the first half 4 sync. blocks out of the sync. blocks recorded in ASCs 1–4 can be played back because of identical ID Nos. assigned to the sync. blocks as well as the identical method of shuffling and method of adding an outer code. On the other hand, the audio data of lower 4 bits recorded in the second half 2 sync. blocks of each ASC having a different ID No. is treated as an error and neglected because of a different ID Nos. Upper 20 bits out of 24 bits audio data can be taken out and played back as 20 bits audio data without any problem. The frequency of reproduced signal played back from the tape increases by several percent; however, the VCR has a program-playback-function which can playback a ape by varying a tape-playback-speed by around 15% or high-speed-playback within ±50 times. Therefore, the video signal and audio signal can be played back without any problems.

When the tape recorded 60*i* signal in accordance with the first embodiment is played back with the VCR in accordance with this seventh embodiment, the audio data of upper 20 bits of channels 1–4 recorded in ASCs 1–4 can be played back because the ID Nos. assigned to the sync. blocks are the same. In this case, the lower 4 bits are inserted 0s (zero), and they are played back as 24 bits data.

In recording a 24*p* signal and an audio signal, the process speed is multiplied by 24/30 to the speed of recording a 60*i* signal. The rotating speed of the rotary drum and the tape speed are also multiplied by 24/30, so that track width of track pattern and a track slant recorded on the tape become the same.

The seventh embodiment proves that when video signals having different frame frequencies are played back, the video signals can be recorded in the same pattern of tracks on a tape, namely in the same size of recording area, by maintaining the sampling frequency and a number of bits of the audio signal. Accordingly, the tape pattern can be identical and recording wavelength on the tape is also identical. These factors allows the device to be designed with ease as well as the circuit to be simplified.

In this seventh embodiment, instead of 24 Hz frame frequency, e.g., a video of 50 Hz field frequency can be recorded. In this case, the outer code of the audio data is RS (18, 10), so that an enough recording area is prepared for the audio data.

Instead of inserting dummy data, meta data—expressing attributes of a recorded signal—can be recorded.

Further, control data such as meta data can be recorded in the dummy data. In this case, the eight sync. blocks, which are not involved in the structure of the outer code, form a new outer code block, then the error correcting capability against errors happened in the tape can be improved. For instance, the meta data is recorded in four sync. blocks, and the outer code parity is recorded in remaining four sync. blocks to form RS(8, 4) code, thereby increasing the error-correcting-capability.

As discussed above, in the case of recording a 60*i* signal and in the case of recording a 24*p* signal, the same number of sync. blocks to be recorded are used. Therefore, the identical hardware after multiplexer 130 can be used.

In this embodiment, both the cases of recording the 60*i* signal and the 24*p* signal use the same number of outer code parities to be added to the audio data, thus the error-correcting-circuit can be commonly shared by both the cases, which reduces the cost.

Various embodiments have been demonstrated above. The signals recorded in each embodiment can be played back in the reversal manner that is self explanatory to the ordinary skilled person in the art.

The audio signal input within one frame or one field is added a product code; however, the audio signal is not limited to the period of one frame or one field, but it may be a given period within which a video data is processed.

In the fourth, fifth and sixth embodiments, the format of an input video signal is an HDTV video signal having 1125 scanning lines, 1080 active scanning lines and 60 Hz field frequency; however, the signal may be a progressive signal having 750 scanning lines, 720 active scanning lines and 59.94 field frequency, or a present TV signal having 525 scanning lines. In the case of the present TV signal, there is no need to compress the signal at coding section 2.

The format of an input video signal used in the present invention is defined as follows:
 a number of scanning lines: 1125 lines;
 a number of active scanning lines: 1080 lines; and
 a field frequency: 60 Hz or
 a frame frequency: 24 Hz.
 However, the following signals can be also used:
 a video signal having the details of:
  a number of scanning lines: 1125 lines;
  a number of active scanning lines: 1080 lines; and
  a field frequency: 60 Hz or 50 Hz, interlace scanning.
 a video signal having the details of:
  a number of scanning lines: 750 lines;
  a number of active scanning lines: 720 lines; and
  a frame frequency: 60 Hz or 48 Hz, progressive scanning.
 a video signal having the details of:
  a number of scanning lines: 750 lines;
  a number of active scanning lines: 720 lines; and
  a frame frequency: 30 Hz or 24 Hz, progressive scanning.
 a video signal having the details of:
  a number of scanning lines: 525 lines;
  a field frequency: 60 Hz, interlace scanning or
  a frame frequency: 24 Hz, progressive scanning.
 a video signal having the details of:
  a number of scanning lines: 525 lines;
  a field frequency: 60 Hz, progressive scanning or
  a frame frequency: 48 Hz, progressive scanning.

In any combination of the signals discussed above, the sampling frequency and a number of bits of the audio signal can be the same by changing a number of audio data and a number of outer code parities responsive to the combination.

In the second embodiment through the seventh embodiment, the 60*i* signal format can be recorded although the description is omitted in each embodiment.

Field frequency 60 Hz may be interpreted as 59.94 Hz, and frame frequency 24 Hz may be 23.976 Hz. On the contrary, field frequency 59.94 Hz may be interpreted as 60 Hz, and frame frequency 23.976 Hz may be 24 Hz.

In the respective embodiments, an audio signal is recorded together with a video signal; however, it is not limited to the audio signal but it may be meta data that indicates attributions of a recorded signal.

A digital VCR is used in the respective embodiments; however, the present invention does not limit to the digital VCR but an optical disc, a hard disc or the like is applicable.

The respective structures of processing video, audio and data are not limited to the embodiments discussed above.

What is claimed is:

1. A record and playback device for handling a first format of recording a first video signal and a first audio signal, and a second format of recording a second video signal having a lower frame frequency than the first video signal and a second audio signal having the same data amount per unit time as the first audio signal, said record and playback device comprising:

a video processor for outputting video recorded data having the same frame frequency as an input video signal, wherein the input video signal is one of the first video signal and the second video signal;

an audio processor for outputting audio recorded data by providing an input audio signal with shuffling and processing of adding an outer code per frame or field of the input video signal, wherein the input audio signal is one of the first audio signal and the second audio signal; and a recording processor for processing output data, supplied from said video processor and said audio processor, to be digitally recorded on a recording medium, wherein said audio processor makes data quantity of the audio recorded data in the first format equivalent per field or frame to that in the second format, and wherein said record and playback device records the video recorded data and the audio recorded data on the recording medium in the same recording-track-format both for the first format and the second format.

2. The record and playback device as defined in claim 1, wherein said audio processor adds less quantity of the outer code in a case of the second format than in a case of the first format.

* * * * *